US008281553B2

(12) United States Patent
Kim

(10) Patent No.: US 8,281,553 B2
(45) Date of Patent: Oct. 9, 2012

(54) AUTOMATED MEDICINE STORAGE AND MEDICINE INTRODUCTION/DISCHARGE MANAGEMENT SYSTEM

(75) Inventor: Jun-Ho Kim, Daegu (KR)

(73) Assignee: JVM Co., Ltd. (KR)

( * ) Notice: Subject to any disclaimer, the term of this patent is extended or adjusted under 35 U.S.C. 154(b) by 321 days.

(21) Appl. No.: 12/788,693

(22) Filed: May 27, 2010

(65) Prior Publication Data

US 2010/0300041 A1 Dec. 2, 2010

(30) Foreign Application Priority Data

May 29, 2009 (KR) ........................ 10-2009-0047587
May 29, 2009 (KR) ........................ 10-2009-0047594
Apr. 6, 2010 (KR) ........................ 10-2010-0031493

(51) Int. Cl.

*B65B 57/00* (2006.01)
*B65B 35/54* (2006.01)
*B65B 61/26* (2006.01)
*G01F 11/42* (2006.01)
*G01F 11/44* (2006.01)

(52) U.S. Cl. .......... 53/131.2; 53/136.1; 53/167; 53/562; 221/9; 221/13; 221/92; 221/133; 700/216; 700/218; 700/225; 700/228; 700/230; 901/39; 901/40

(58) Field of Classification Search ................. 53/131.2, 53/131.5, 136.1, 167, 550, 562, 284.7; 221/9, 221/13, 92, 133; 700/216, 218, 225, 228, 700/230; 901/39, 40; *G07F 11/42, 11/44*
See application file for complete search history.

(56) References Cited

U.S. PATENT DOCUMENTS 4,546,901 A * 10/1985 Buttarazzi ....................... 221/13
6,002,125 A * 12/1999 Schubert .................. 250/223 R
6,006,946 A 12/1999 Williams et al.
6,883,681 B1 * 4/2005 Coughlin et al. ............. 221/133
2001/0001358 A1 * 5/2001 Yuyama et al. .............. 53/131.2
2004/0039482 A1 2/2004 Thomas et al.
2004/0040975 A1 3/2004 Hunter et al.
2005/0115200 A1 * 6/2005 Sung ............................ 53/131.2
(Continued)

FOREIGN PATENT DOCUMENTS

EP 0298588 1/1989
(Continued)

OTHER PUBLICATIONS

European Search Report-EP Application No. 10164103.3 dated Sep. 6, 2010, 6 pages.

*Primary Examiner* — Stephen F Gerrity
(74) *Attorney, Agent, or Firm* — Cantor Colburn LLP

(57) ABSTRACT

Disclosed is an automated medicine storage and medicine introduction/discharge management system, which includes a main body in which a plurality of receiving shelves is arranged, the main body having a door to enable user access, a medicine introduction/discharge unit installed in one side region of the main body to introduce or discharge a medicine product into or out of the main body, a robot transfer unit installed in the main body to transfer the medicine product, introduced via the medicine introduction/discharge unit, to each receiving space of the main body, or to discharge the medicine product received in the receiving space, and a control unit to control operations of the main body, the medicine introduction/discharge unit, and the robot transfer unit. The system is able to store a variety of medicine in a single main body and to achieve enhanced security for special medicine and efficient management of stock.

21 Claims, 22 Drawing Sheets

U.S. PATENT DOCUMENTS

| | | | | |
|---|---|---|---|---|
| 2005/0257497 | A1* | 11/2005 | Kim | 53/131.5 |
| 2006/0107623 | A1 | 5/2006 | Rice et al. | |
| 2007/0005182 | A1* | 1/2007 | Downs et al. | 700/218 |
| 2008/0173664 | A1* | 7/2008 | Kim | 221/133 |
| 2008/0264967 | A1* | 10/2008 | Schifman et al. | 221/133 |
| 2010/0095635 | A1* | 4/2010 | Ishiwatari et al. | 53/131.2 |

FOREIGN PATENT DOCUMENTS

| | | |
|---|---|---|
| EP | 0338446 | 10/1989 |
| EP | 1857356 | 11/2007 |
| WO | 00/34925 | 6/2000 |
| WO | WO 2008031213 A1 * | 3/2008 |

* cited by examiner

AUTOMATED MEDICINE STORAGE AND MEDICINE INTRODUCTION/DISCHARGE MANAGEMENT SYSTEM

BACKGROUND OF THE INVENTION

1. Field of the Invention

The present invention relates to a management system to store a plurality of medicine products and manage introduction/discharge of the medicine products in an automated manner, and more particularly, to an automated medicine storage and medicine introduction/discharge management system, in which a plurality of medicine products can be automatically introduced into and stored in a single main body and be automatically discharged according to a user demand, the management system providing the medicine products with an optimum storage environment.

2. Description of the Related Art

Generally, hospitals, large pharmacies, and the like have a need to store and manage a great variety of medicine products to be administered to different patients, and kinds of medicine products that should be dispensed by pharmacists are gradually increasing as new medicine products appear every year with developments in pharmacology.

Accordingly, the management of medicine products has become increasingly complicated, and manually recording lists of medicine products has a difficulty in proper management of enormous data. In the case of a combination of tablets, filling a prescription at a conventional pharmacy consumes a long time and has the risk of severely injuring patient's health due to pharmaceutical errors. For these reasons, an automated stock management system has been gradually launched in related fields.

However, since medicine products have irregular sizes, there is a technical difficulty in transferring and loading medicine products by use of an automated system, and it is difficult to determine stock of medicine products and to detect, grip, and transfer medicine products within a limited space.

Therefore, there is a demand for an automated medicine storage and medicine introduction/discharge management system, in consideration of manufacturing cost saving and easy grasping of stock and introduction/discharge of medicine products.

SUMMARY OF THE INVENTION

Therefore, the present invention has been made in view of the above problems, and it is an object of the present invention to store medicine products in a single main body and to introduce or discharge the medicine products into or out of the main body in an automated manner.

It is another object of the present invention to measure the size of a medicine product when the medicine product is introduced into a main body.

It is another object of the present invention to measure the size of a medicine product by detecting a shadow image of the medicine product produced by a light source.

It is another object of the present invention to record information of a medicine product to be introduced into or discharged out of a main body and attach a recorded label to the medicine product.

It is another object of the present invention to attach a label, containing information of a medicine product, to the medicine product upon introduction of the medicine product.

It is another object of the present invention to put or take a medicine product into or out of a selected receiving space defined in a main body via horizontal or vertical movement and rotation of the medicine product.

It is another object of the present invention to provide a robot arm capable of directly entering a receiving space of a main body thus implementing simultaneous transfer of a plurality of medicine products.

It is another object of the present invention to transfer a medicine product to a preset position without the risk of falling.

It is another object of the present invention to allow a medicine product to be rotated in a limited space while being stably gripped.

It is another object of the present invention to store combinations of tablets as well as medicine products.

It is another object of the present invention to enable the packing and discharge of combinations of tablets stored along with medicine products.

It is another object of the present invention to allow a user to open a receiving space, in which combinations of tablets are stored, from the outside of a main body.

It is another object of the present invention to allow a user to pull a receiving space, in which combinations of tablets are received, out of a main body.

It is another object of the present invention to keep a medicine product storage space at an optimum temperature and humidity condition.

It is another object of the present invention to store a great quantity of medicine products and to input and store information of the medicine products.

It is another object of the present invention to enable repeated detection of information related to a great quantity of medicine products.

It is another object of the present invention to detect and store size information of each medicine product.

It is another object of the present invention to transfer a medicine product by gripping the medicine product using a suction plate.

It is another object of the present invention to detect a variety of information of a medicine product.

It is a further object of the present invention to input and record information of a medicine product and manage introduction/discharge of the medicine product based on the recorded information.

In accordance with an aspect of the present invention, the above and other objects can be accomplished by the provision of an automated medicine storage and medicine introduction/discharge management system including a main body in which a plurality of receiving shelves is arranged, the main body having a door to enable user access, a medicine introduction/discharge unit installed in one side region of the main body to introduce or discharge a medicine product into or out of the main body, a robot transfer unit installed in the main body to transfer the medicine product, introduced via the medicine introduction/discharge unit, to each receiving space of the main body, or to discharge the medicine product received in the receiving space, and a control unit to control operations of the main body, the medicine introduction/discharge unit, and the robot transfer unit.

The medicine introduction/discharge unit may include a medicine seating conveyor installed to communicate the interior of the main body with the outside through an opening perforated in a position of the main body and having an upper surface on which the medicine product is seated, a door member installed in a vertically movable manner to open or close the opening of the main body when the medicine product is put on or taken out from the medicine seating conveyor, a shadow detection sensor installed under the medicine seating conveyor and having a light source to detect a shadow image of a bottom surface of the medicine product seated on the medicine seating conveyor, and a height meter installed to one side of the door member and serving to measure a height of the medicine product seated on the medicine seating conveyor via vertical movement of the door member.

The medicine seating conveyor may be made of a light transmission material.

The system may further include a label attachment unit provided at a side of the medicine introduction/discharge unit and serving to print information of the medicine product to be introduced into the main body and attach the label to the medicine product.

The label attachment unit may be located within the main body, and may include a label printing device to print and discharge the label, and a label attachment device to press and attach the label, printed by the label printing device, onto an upper surface of the medicine product via vertical movement thereof.

The robot transfer unit may include main guide rails installed at inner ceiling and bottom surfaces of the main body respectively, a vertical post inserted into the main guide rails to perform a horizontal sliding motion, and a robot arm installed to the vertical post so as to move to each receiving space within the main body via vertical and horizontal movements and rotation thereof.

The robot arm may include a grip device having a pair of parallel grippers to be moved together in a front and rear (X-axis) direction, a distance (Y-axis width) between facing inner surfaces of which is adjustable to grip the medicine product, a bottom transfer device having a conveyor belt to transfer the medicine product released from the grippers and other medicine products in the front and rear (X-axis) direction, and a rotating device installed beneath the bottom transfer device to rotate the bottom transfer device.

The grip device may include a carrier installed on a rail extending in a front and rear direction inside a housing and coupled to a belt, circulated in the front and rear direction by a drive motor, so as to be moved in the front and rear direction, the carrier having a pinion installed thereon, rotation of which is controlled by an operation motor, and a bracket having a rack engaged with the pinion to be moved leftward or rightward via rotation of the pinion and a vertical plate provided at a distal end of the rack and coupled with a corresponding one of the grippers.

The pair of grippers may be installed parallel to each other, and oblique pads protrude from opposite ends of facing inner surfaces of the grippers.

The robot arm may further include stopper plates provided at front and rear ends of an upper surface thereof and adapted to be moved vertically to prevent separation of the medicine product.

The robot arm may further include position sensors provided at front and rear ends of an upper surface thereof and serving to sense the medicine product to be discharged.

The robot arm may have a length to allow the robot arm to be rotated by the rotating device within the main body.

The system may further include a tablet discharge device including a tablet cassette shelf on which a plurality of tablet cassettes is mounted so as to be separable by the robot transfer unit, the tablet cassettes being installed to communicate with respective discharge passages to make a combination of tablets, and a tablet packing unit including a distribution tray located below the tablet discharge device to discharge ½ or ¼ sized tablets, a printing device to print information of the tablets on a packing pouch in which the tablets received in the distribution tray are packed, and a sealing device to seal the packing pouch.

The tablet discharge device may include a door having one side hinged to the main body to allow a front surface of the main body to be opened from the outside, so as to expose a front region of the main body in which the discharge passages are located and the tablet cassette shelf is installed.

The tablet discharge device and the tablet packing unit may be provided at opposite side surfaces thereof with guide rails so as to be pulled out of the main body, and the tablet discharge device may include a rotating shaft connected to a drive unit so as to be rotatable in a pulled position thereof.

The main body may be provided with a refrigerator and a humidifier to keep the main body at a constant temperature and humidity.

The system may further include a high volume medicine introduction/discharge unit provided in the main body to introduce a great quantity of medicine products and detect kinds of the medicine products.

The high volume medicine introduction/discharge unit may include a medicine transfer device to introduce the medicine products into a high volume medicine introduction body installed to communicate with the main body, the medicine products being transferred through the interior of the high volume medicine introduction body from the outside in a loop route, a shadow detection device to detect a profile of each of the medicine products passing through the interior of the high volume medicine introduction body so as to produce profile information, a transfer robot arm to grip and transfer each of the medicine products based on the profile information, and a barcode reading device to acquire information of the medicine products by reading a barcode of the gripped medicine product.

The medicine transfer device may include an outer conveyor belt mechanism to transfer the medicine products from a medicine inlet portion, provided at the outside of the high volume medicine introduction body, into the high volume medicine introduction body through an entrance gate perforated in one side of the high volume medicine introduction body, an inner conveyor belt mechanism including an oblique conveyor belt to move the medicine products having passed through the entrance gate, and a light transmission conveyor belt horizontally installed at a distal end of the oblique conveyor belt, and an oblique block provided in front of the light transmission conveyor belt to allow the medicine products to return to the inlet portion through a return gate perforated in the other side of the high volume medicine introduction body.

The transfer robot arm may displace a position of the medicine product on the light transmission conveyor belt to repeatedly detect the profile of the medicine product if the profile information acquired by the shadow detection device is unclear.

The transfer robot arm may include a suction plate provided at a lower end thereof to grip an upper surface of the medicine product via air suction.

The barcode reading device may include a first barcode reader to scan a bottom surface of the medicine product when the medicine product is horizontally rotated in the air while being gripped by the transfer robot arm, and second and third barcode readers to scan the upper surface and side surface of the medicine product individually or simultaneously.

The control unit may include an input unit to input information of the medicine product to be introduced into or discharged out of the main body and to record the information on a database, an information processing unit to acquire desired information from the information input by the input unit, and a transmission unit to transmit a drive command to each unit.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Hereinafter, configuration and operation of an automated medicine storage and medicine introduction/discharge management system according to a preferred embodiment of the present invention will be described in detail with reference to the accompanying drawings.

Figure 1:
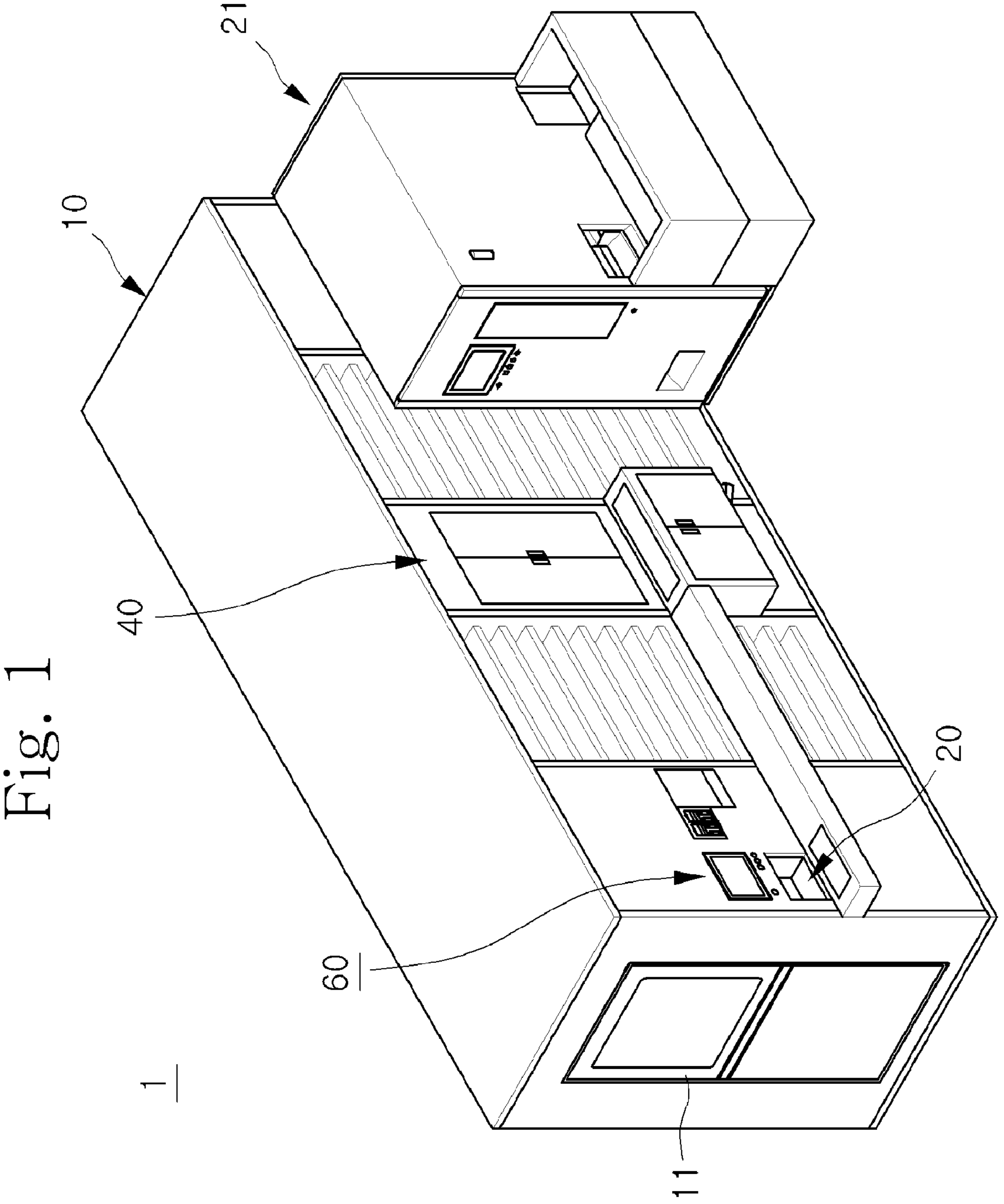
FIG. 1 is a schematic perspective view of an automated medicine storage and medicine introduction/discharge management system according to an embodiment of the present invention.
Figure 2:
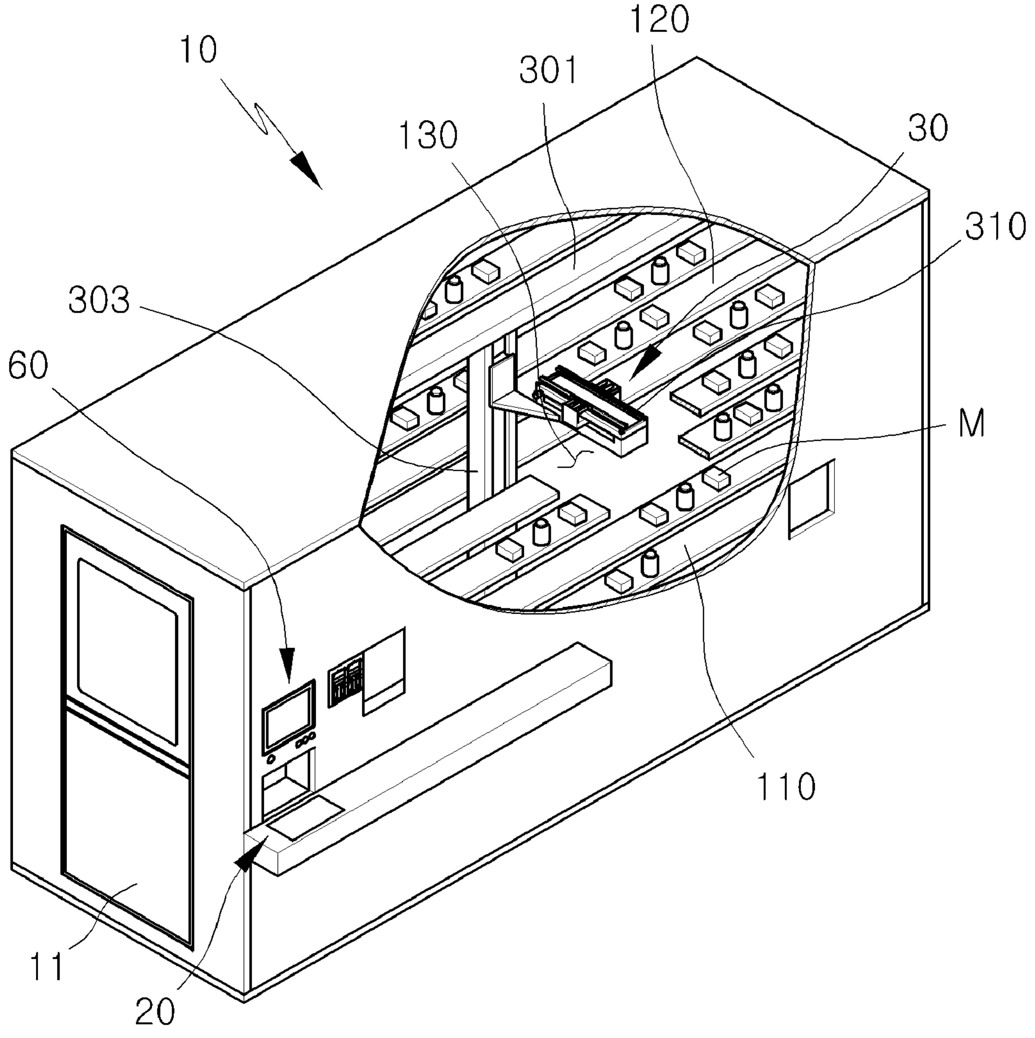
FIG. 2 is a partial cut away perspective view of the automated medicine storage and medicine introduction/discharge management system according to the present invention.

FIG. 1 is a schematic perspective view of the automated medicine storage and medicine introduction/discharge management system according to the preferred embodiment of the present invention, and FIG. 2 is a partial cut away perspective view of the automated medicine storage and medicine introduction/discharge management system according to the present invention.

As illustrated, the automated medicine storage and medicine introduction/discharge management system 1 according to the embodiment of the present invention includes a main body in which a plurality of receiving spaces is defined, a medicine introduction/discharge unit 20 to introduce or discharge a medicine product into or out of the main body 10 through an opening perforated in the main body 10, a robot transfer unit 30 to put or take out the medicine product, introduced via the medicine introduction/discharge unit 20, into or out of a selected receiving space of the main body 10, and a control unit 60 to control operations of the main body 10, the medicine introduction/discharge unit 20, and the robot transfer unit 30.

Preferably, the automated medicine storage and medicine introduction/discharge management system 1 further includes a high volume medicine introduction/discharge unit 21 to sort a great quantity of medicine products and introduce them into the main body 10, and a tablet packing unit 40 in which a combination of tablets is prepared and packed.

The main body 10 provides a receiving space in which medicine products are stored, and is provided with a plurality of shelves. The shelves, as illustrated in FIG. 2, include at least one front shelf 110 and at least one rear shelf 120 installed separately in front and rear regions of the main body 10. A working space 130 is defined between the front shelf 110 and the rear shelf 120, in which the robot transfer unit 30 as will be described hereinafter is movable to put or take a medicine product on or out of the corresponding shelf.

The main body 10 is provided at one side thereof with a main body door 11, to allow a user to directly enter the working space 130 defined in the main body 10 in order to perform a manual operation.

Of medicine products stored in the main body 10, some special medicine products, such as injections, etc., may need to be stored at a refrigeration temperature lower than room temperature. To store these special medicine products, a refrigerator (not illustrated) may be provided in the main body 10 to refrigerate a medicine product.

The refrigerator is preferably a conventional refrigeration air conditioning device that is operated upon receiving power, and more preferably, a thermocouple device that has a simplified configuration and small volume and consumes a small amount of electrical power.

By allowing these medicine products having a refrigeration storage temperature, such as injections, etc., to be stored in the main body 10, the present invention is advantageous in that diverse kinds of medicine products can be stored. In addition, although not illustrated, for example, a conventional temperature and humidity control device may be installed to prevent heat emitted from the refrigerator from having an effect on medicine products stored in the main body 10.

Figure 3A:
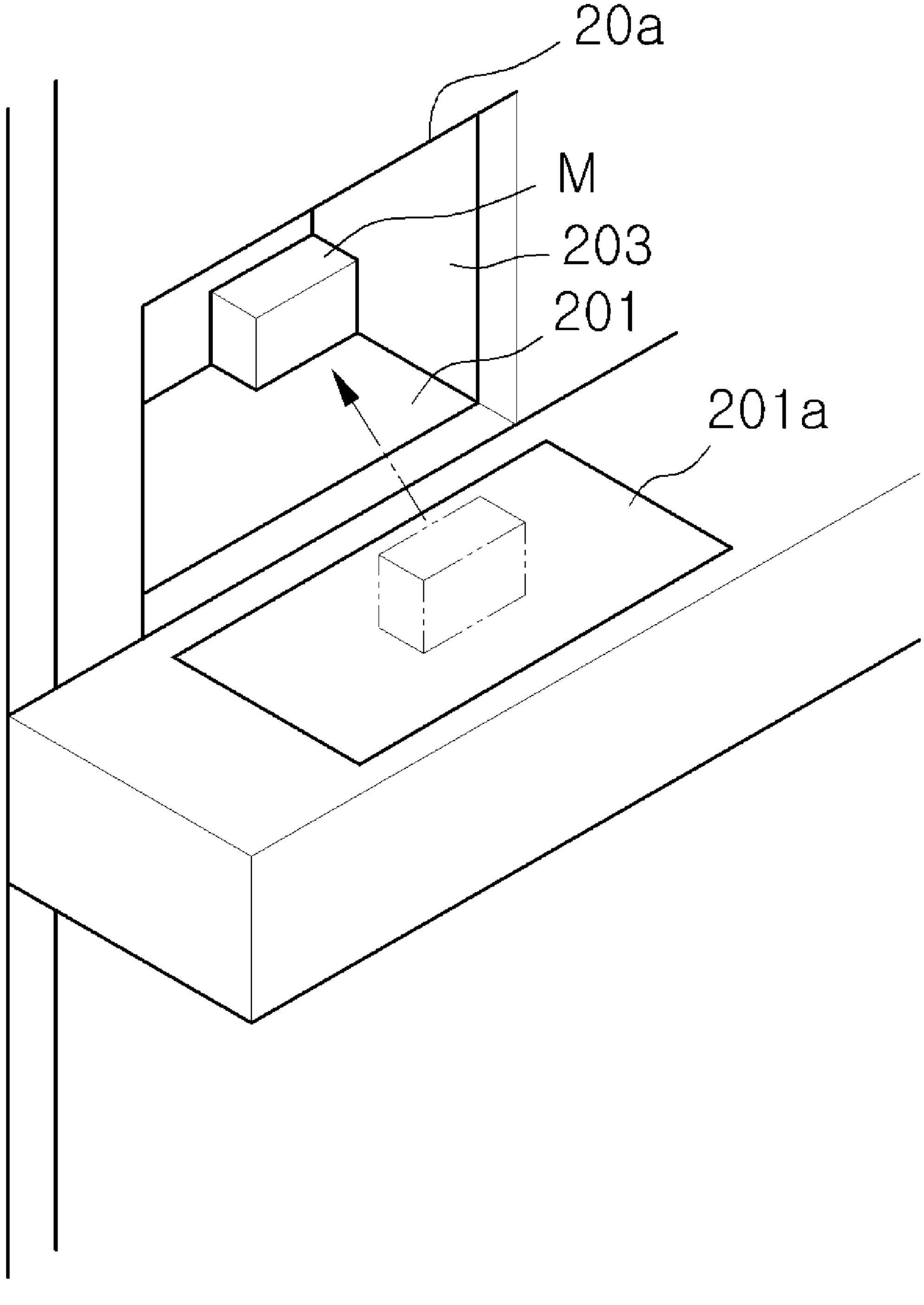
FIG. 3A is a view illustrating a process of seating a medicine product on a medicine seating conveyor of a medicine introduction/discharge unit of the automated medicine storage and medicine introduction/discharge management system according to the present invention.
Figure 3B:
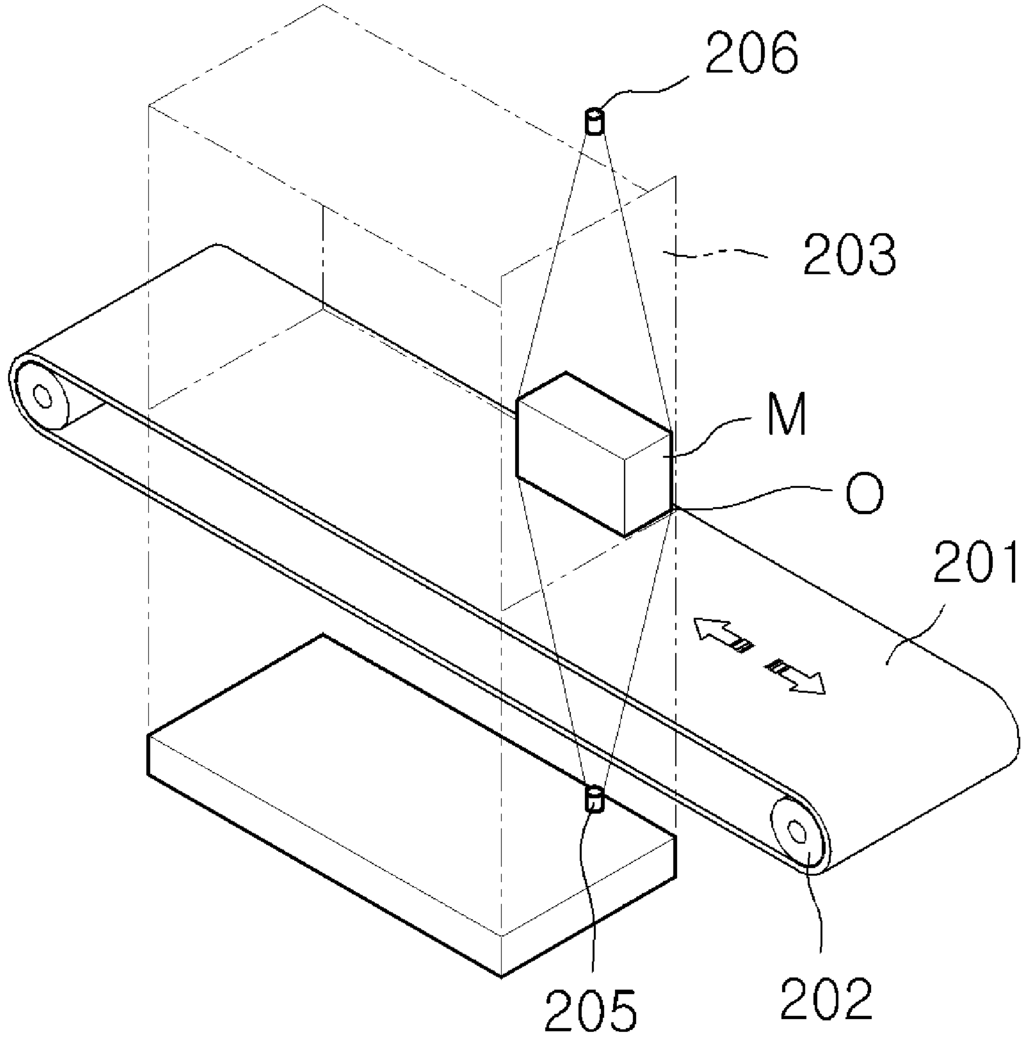
FIG. 3B is a view illustrating a shadow detection process of the medicine introduction/discharge unit of the automated medicine storage and medicine introduction/discharge management system according to the present invention.

FIG. 3A is a view illustrating a process of seating a medicine product on a medicine seating conveyor of the medicine introduction/discharge unit of the automated medicine storage and medicine introduction/discharge management system according to the present invention, and FIG. 3B is a view illustrating a shadow detection process of the medicine introduction/discharge unit of the automated medicine storage and medicine introduction/discharge management system according to the present invention.

Figure 3C:
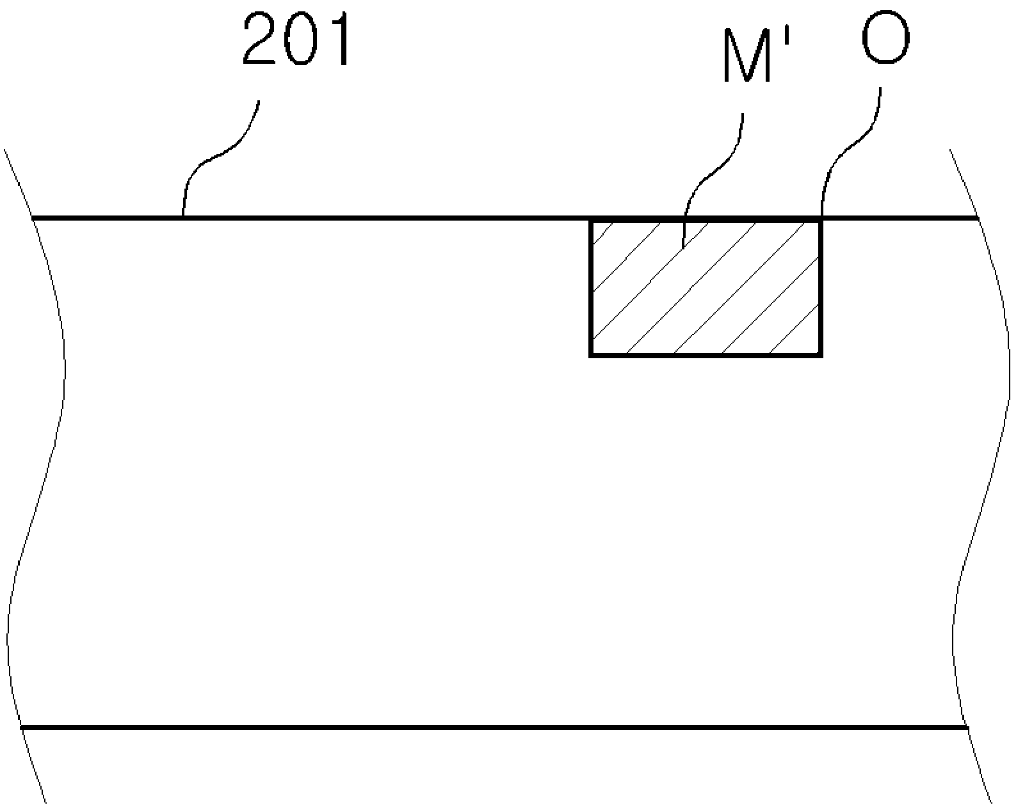
FIG. 3C is a view illustrating a shadow image of a bottom surface of a medicine product detected by the medicine introduction/discharge unit of the automated medicine storage and medicine introduction/discharge management system according to the present invention.
Figure 3D:
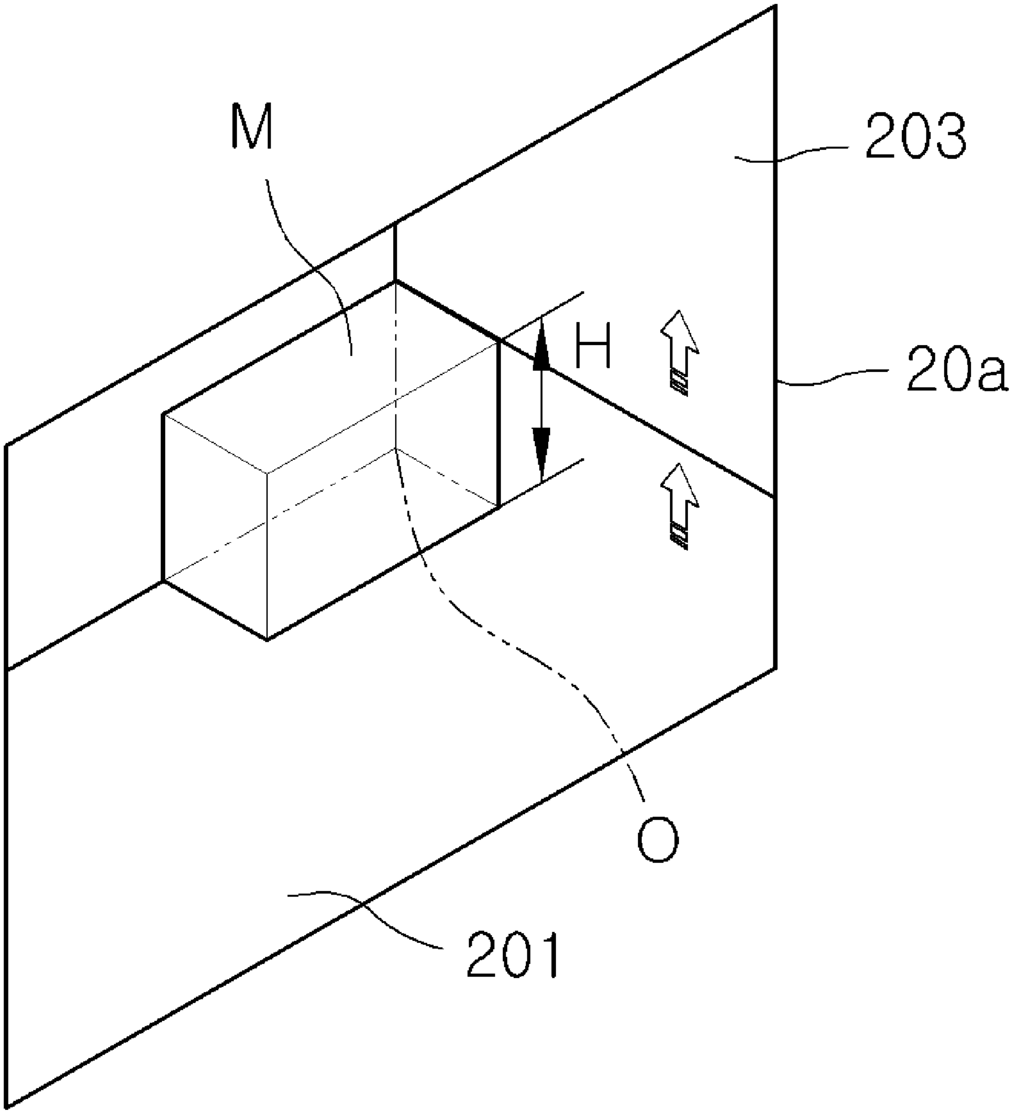
FIG. 3D is a view illustrating a process of measuring the height of a medicine product via vertical movement of a medicine introduction/discharge door member provided in the medicine introduction/discharge unit of the automated medicine storage and medicine introduction/discharge management system according to the present invention.

FIG. 3C is a view illustrating a shadow image of a bottom surface of a medicine product detected by the medicine introduction/discharge unit of the automated medicine storage and medicine introduction/discharge management system according to the present invention, and FIG. 3D is a view illustrating a process of measuring the height of a medicine product via vertical movement of a medicine introduction/discharge door member provided in the medicine introduction/discharge unit of the automated medicine storage and medicine introduction/discharge management system according to the present invention.

The medicine introduction/discharge unit 20, as illustrated in FIGS. 3A to 3D, includes a medicine seating conveyor 201, a medicine introduction/discharge door member 203, a shadow detection device 205, and a height meter (not illustrated). The medicine seating conveyor 201 is installed at the bottom of a medicine inlet port 20*a* that is recessed inward near a side edge of the main body 10 to define a predetermined space and serves to support a medicine product M seated thereon. The medicine introduction/discharge door member 203 is installed in a vertically movable manner to open or close the medicine inlet port 20*a* when a medicine product is put on or taken out from the medicine seating conveyor 201. The shadow detection device 205 is arranged under the medicine seating conveyor 201 and serves to form an image of a bottom surface of the medicine product M seated on the medicine seating conveyor 201. The height meter (not illustrated) is installed to one side of the medicine introduction/discharge door member 203 and serves to measure the height of the medicine product M seated on the medicine seating conveyor 201 via vertical movement of the medicine introduction/discharge door member 203.

The medicine seating conveyor 201, as illustrated in FIG. 3A, is provided with a barcode reading device 201*a*. The barcode reading device 201*a* is used to read a barcode present on a front surface of the medicine product M and to input information, such as a kind and expiration date of a medicine to be introduced, to the control unit 60 that will be described hereinafter.

Preferably, the medicine seating conveyor 201, as illustrated in FIG. 3B, takes the form of a conveyor belt that connects the medicine introduction/discharge unit 20 to the interior of the main body 10. In this case, the medicine seating conveyor 201 may be driven by a plurality of introduction/discharge rollers 202, allowing the medicine product M seated on the medicine seating conveyor 201 to be introduced into the main body 10.

In the present invention, there is provided a vision system above and below the medicine seating conveyor 201 in the form of a conveyor belt. The vision system includes a light source 206 installed above the medicine seating conveyor 201 to irradiate light to the medicine product M seated on the medicine seating conveyor 201, and the shadow detection device 205 installed below the medicine seating conveyor 201 to detect a shadow image of the bottom surface of the medicine product M. In this case, the medicine seating conveyor 201 is formed of a mesh that is made of a material capable of transmitting light from the light source 206, such as cloth, synthetic resin including, e.g., polyvinyl chloride (PVC), etc. Thus, when light is irradiated to the medicine seating conveyor 201, the profile of the medicine product M can be projected downward. Although not illustrated, a hopper to condense light is provided at the upper side of the shadow detection device 205, such that the shadow detection device 205 produces profile information upon receiving the light having passed through the hopper.

Specifically, if the light source 206 is operated above the medicine seating conveyor 201, as illustrated in FIG. 3C, the shadow detection device 205 below the medicine seating conveyor 201 can detect the shadow image of the medicine product M from light by the bottom surface of the medicine product M.

In this case, detailed configurations for the detection of the size and shadow image of the medicine product M using the shadow detection device 205 are described in, for example, European Laid-Open Patents NO. EP 0298588 entitled "Shadow Detecting Optical Micrometer" and NO. EP 0338446 entitled "Optical Convex Surface Profiling and Gauging Apparatus and Method Therefor".

The profile information acquired by the shadow detection device 205 includes position information of the medicine product, which is acquired in such a manner that the control unit 60 sets the medicine seating conveyor 201 as a coordinate plane and calculates coordinate values of the profile of the medicine product M, and size information calculated from the profile of the medicine product M.

The profile information is transmitted to the control unit 60, and the control unit 60 controls operation of a robot arm based on the profile information, such that the robot arm that will be described hereinafter is able to grip the center of an upper surface of the medicine product M by use of a suction plate so as to transfer the medicine product M.

The medicine introduction/discharge door member 203, installed at one side of the medicine seating conveyor 201 in the form of a conveyor belt, as illustrated in FIG. 3D, serves to measure the height of the medicine product M via vertical movement thereof once the shadow detection device 205 forms a shadow image of the bottom surface of the medicine product M seated on the medicine seating conveyor 201.

More specifically, the height meter for the medicine product M is installed to receive light from the light source 206 via vertical movement of the medicine introduction/discharge door member 203. Accordingly, the height of the medicine product M can be measured while the medicine introduction/discharge door member 203 is vertically moved to allow the medicine product M to be introduced into the main body 10. In this case, to initiate operation of the height meter, the medicine product M is preferably seated on a corner region O, i.e. a distal end of a boundary where the medicine seating conveyor 201 and the medicine introduction/discharge member 203 meet each other.

This is because the corner region O is a reference point of coordinates to calculate the area of the medicine product M.

Accordingly, as illustrated in FIG. 3A, after the user scans a barcode of the medicine product M using the barcode reading device 201*a* in order to introduce the medicine product M into the main body 10, the user seats the medicine product M on the corner region O between the medicine seating conveyor 201 and the medicine introduction/discharge door member 203.

Thereafter, when the light source 206 irradiates light as illustrated in FIG. 3B, the shadow detection device 205 detects the shadow image of the bottom surface of the medicine product M projected through the medicine seating conveyor 201 as illustrated in FIG. 3C, and transmits detected shadow information to the control unit 60. The control unit 60 calculates the area of the bottom surface of the medicine product M based on the shadow information.

Next, the medicine introduction/discharge door member 203 transmits height information of the medicine product M, measured by the height meter via vertical movement thereof, to the control unit 60. The medicine product M is introduced into the main body 10 by the medicine seating conveyor 201 in the form of a conveyor belt.

Once the bottom area and height of the medicine product M are measured via the above described processes, the control unit 60 calculates the volume of the introduced medicine product M based on the bottom area and height information of the medicine product M.

After calculation of the volume of the medicine product M, the control unit 60 selects one of the front shelf 110 and the rear shelf 120 on which the medicine product M can be received, and the robot transfer unit 30 that will be described hereinafter transfers the medicine product M to the selected shelf for the storage of the medicine product M.

On the other hand, when it is desired to discharge the medicine product M out of the main body 10, once the medicine product M is seated on the medicine seating conveyor 201 in the form of a conveyor belt in reverse order of the above described process, the medicine introduction/discharge door member 203 is opened and the introduction/discharge rollers 202 are rotated in a reverse direction, enabling discharge of the medicine product M.

Figure 4:
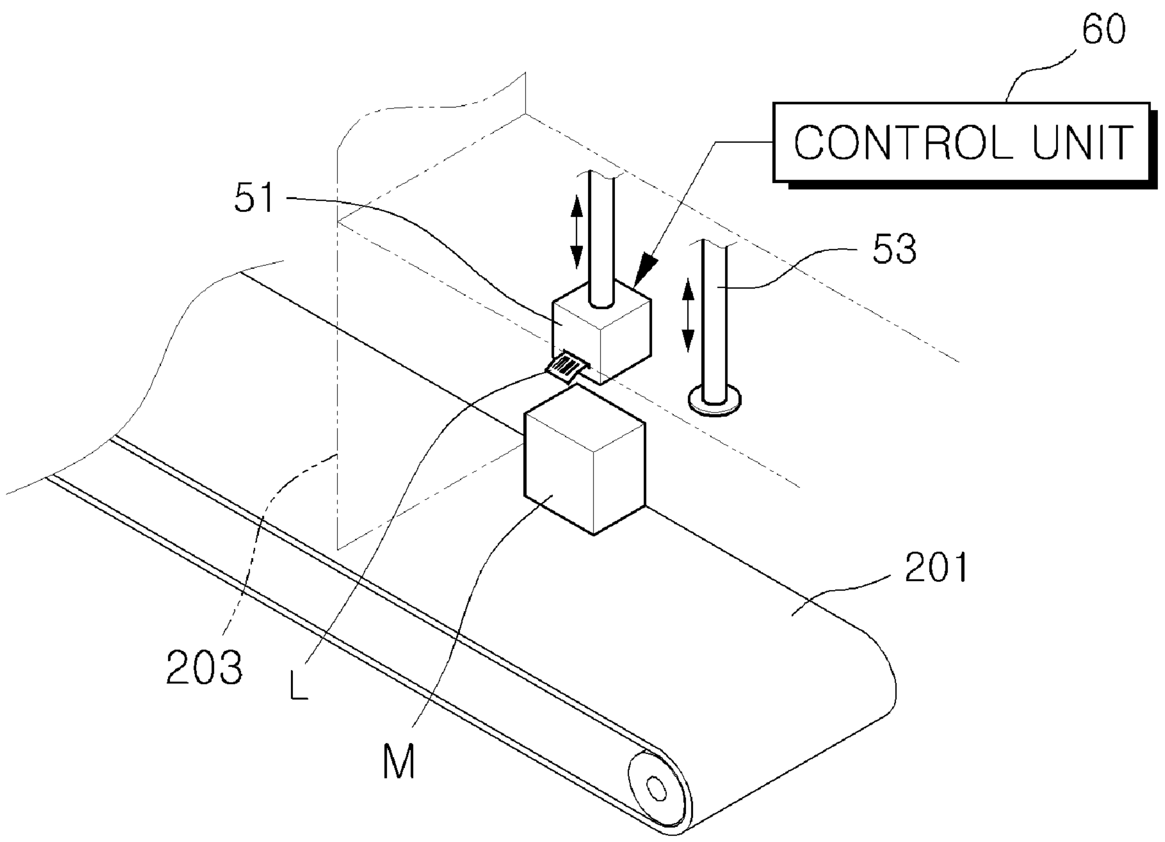
FIG. 4 is a view illustrating a label attachment unit of the automated medicine storage and medicine introduction/discharge management system according to the present invention.

FIG. 4 is a view illustrating a label attachment unit of the automated medicine storage and medicine introduction/discharge management system according to the present invention.

The label attachment unit 50 is provided next to the medicine introduction/discharge unit 20 and serves to input changed information of the medicine product M to the control unit 60 and to print and attach a label to the medicine product M.

More specifically, although it is sufficient, upon introduction of a new medicine product via the medicine introduction/discharge unit 20, to simply read a barcode of the medicine product in order to store the medicine product in the main body 10, if the medicine product to be introduced is a bulk of medicine or contains a medicine requiring strict management, such as narcotics, it is necessary to record a used amount or a required residual amount of the medicine when only a part of the medicine is used and the remaining medicine is restored in the main body 10.

The label attachment unit 50 includes a label printing device 51 and a label attachment device 53. Once the medicine product M is introduced through the introduction/discharge door 203 installed on the medicine seating conveyor 201, the label printing device 51 is moved down to the top of the medicine product M and discharges a label L on which information of the medicine product M input by the user is printed in barcode form. When the discharged label L is seated on the upper surface of the medicine product M, the label attachment device 53 is moved vertically to press and attach the label L to the medicine product M.

Accordingly, if the user inputs information of the medicine product M, i.e. the expiration date or residual amount of medicine, via the control unit 60, the label attachment unit 50 outputs the barcode label L on which information of the medicine product M is input, and then, attaches the label L to the medicine product M.

As will be appreciated, the label attachment unit 50 for the medicine product M can be operated upon introduction of the medicine product M, and also, if necessary, be used when the medicine product M transferred to the label attachment unit 50 is discharged by use of a robot arm 310.

Figure 5:
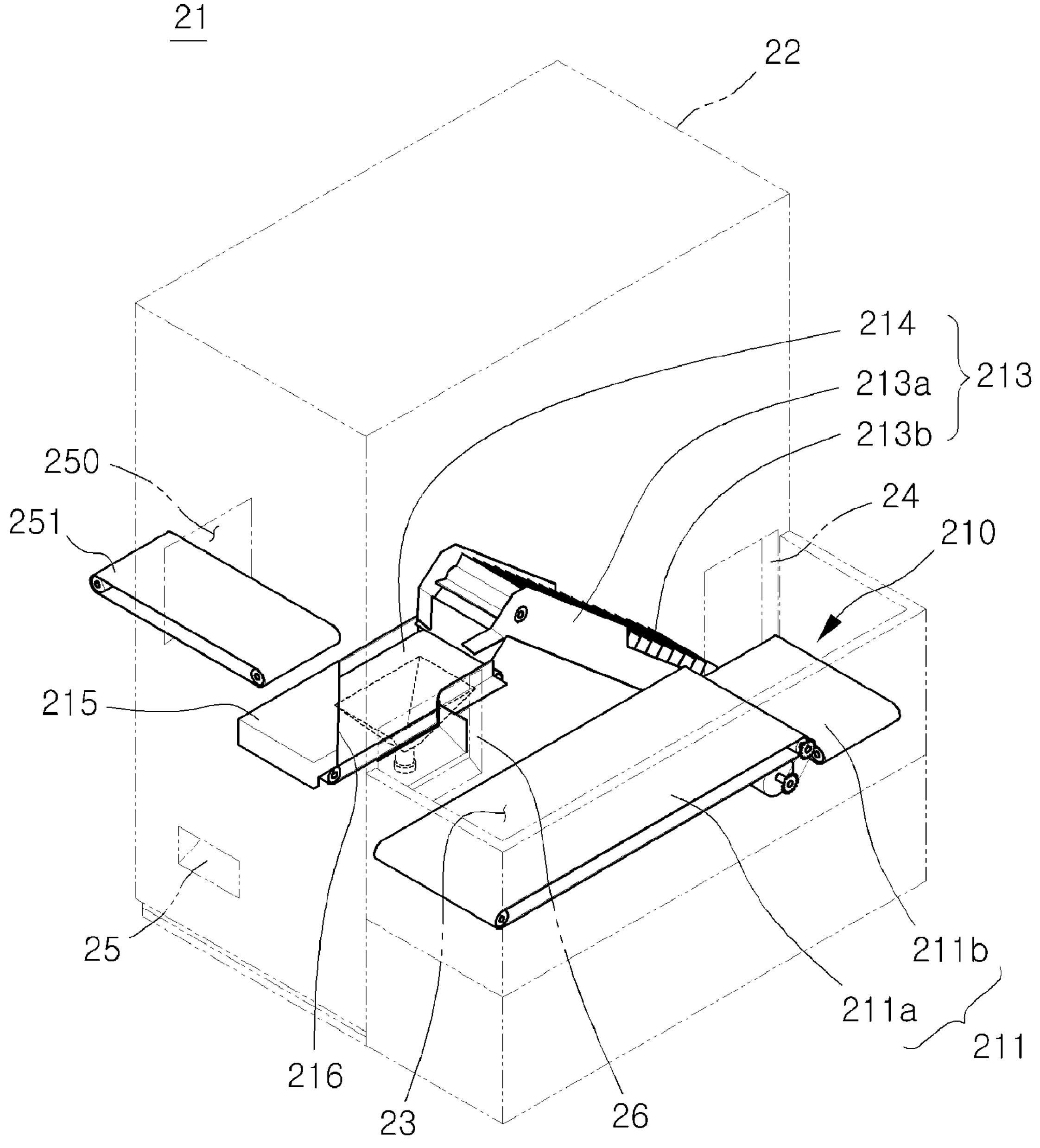
FIG. 5 is a view illustrating a high volume medicine introduction/discharge unit of the automated medicine storage and medicine introduction/discharge management system according to the present invention.
Figure 6:
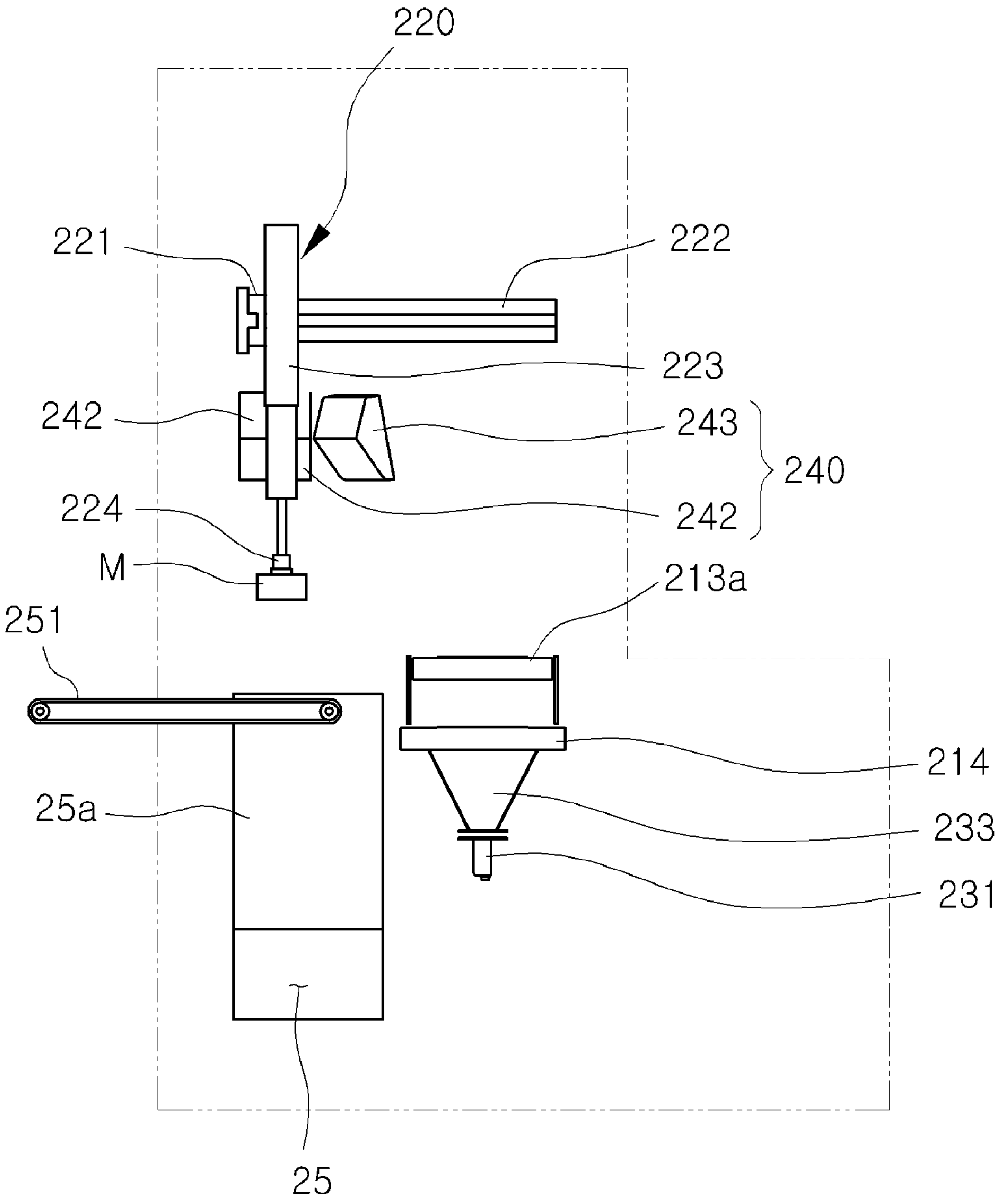
FIG. 6 is a schematic front view of the high volume medicine introduction/discharge unit illustrated in FIG. 5.
Figure 7:
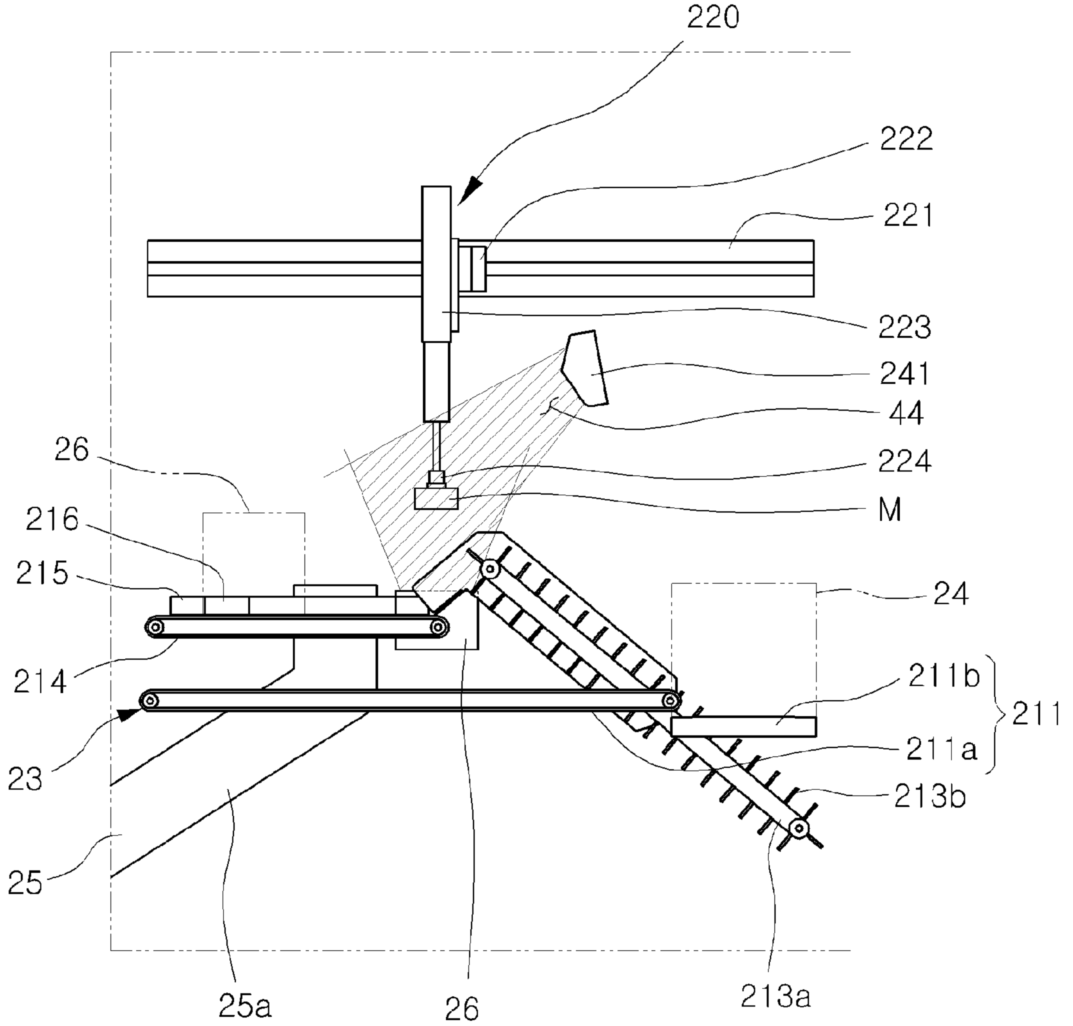
FIG. 7 is a schematic side view of the high volume medicine introduction/discharge unit illustrated in FIG. 5.

FIG. 5 is a view illustrating a high volume medicine introduction/discharge unit of the automated medicine storage and medicine introduction/discharge management system according to the present invention, FIG. 6 is a front view of the high volume medicine introduction/discharge unit according to the present invention, and FIG. 7 is a side view of the high volume medicine introduction/discharge unit according to the present invention.

As illustrated, when it is desired to introduce a large quantity of medicine products M into the main body 10, it is preferable to provide the high volume medicine introduction/discharge unit 21 because the medicine introduction/discharge unit 20 as described above, if used, would consume an excessively long medicine sorting time.

The high volume medicine introduction/discharge unit 21 has a configuration similar to that of the medicine introduction/discharge unit 20, and includes a medicine transfer device 210, a transfer robot arm 220, a shadow detection device 230, a barcode reading device 240, and an outlet port 250.

The high volume medicine introduction/discharge unit 21 is installed in a high volume medicine introduction body 22 that is installed at one side of the main body 10 to communicate with the main body 10. The high volume medicine introduction body 22 includes a medicine inlet portion 23 through which a medicine product is introduced from the outside, an entrance gate 24 through which the introduced medicine product is directed into the high volume medicine introduction body 22, and an exit hole 25 through which the medicine product is discharged to the outside.

The medicine transfer device 210 serves to move a great quantity of medicine products, stacked on the medicine inlet portion 23 provided at one side of the high volume medicine introduction body 22, small amount at a time. The shadow detection device 230 serves to produce profile information including position information of a medicine product on the medicine transfer device 210. The transfer robot arm 220 serves to grip and transfer a medicine product under control of the control unit 60 based on the profile information. The barcode reading device 240 serves to acquire information of a medicine product from a barcode attached to the medicine product while the transfer robot arm 220 moves the medicine product, and transmits the acquired information to the control unit 60. The medicine product, information of which has been completely acquired, is moved to the outlet port 250 by the transfer robot 220, and thereafter, is transferred from the outlet port 250 to a selected shelf of the main body 10 so as to be stored on the shelf.

Here, the medicine information includes a medicine name, production date, management level, etc., and is utilized for management of stock. In the present invention, the acquisition of medicine information is referred to the sorting of medicine.

The medicine transfer device 210 is operated according to a transfer command of the control unit 60, to transfer medicine products, disposed on the medicine inlet portion 23, sequentially into the high volume medicine introduction body 22 through the entrance gate 24 that is perforated in the other side region of the high volume medicine introduction body 22. As the transferred medicine products sequentially pass through the shadow detection device 230, profile signals of the medicine products are produced. In addition, if the shadow detection device 230 fails to produce profile information of any one of the medicine products, the medicine transfer device 210 is operated to discharge the corresponding medicine product through a return gate 26 perforated in one side region of the high volume medicine introduction body 22, so as to return the medicine product to the medicine inlet portion 23. Then, the medicine transfer device 210 transfers the returned medicine product to the shadow detection device 230 through the entrance gate 24, such that the shadow detection device 230 attempts to detect profile information of the medicine product again.

As described above, since the medicine product is transferred in a loop route by the medicine transfer device 210, even if detection of the profile of any one medicine product fails and the transfer robot arm 220 cannot grip the medicine product, acquisition of the profile information and sorting of the remaining medicine products are possible without requiring operation of the overall system to be stopped. In conclusion, medicine products, profile information of which is acquirable, can be sorted continually without user intervention, and even if acquisition of the profile information of any medicine product fails under specific conditions, the shadow detection device 230 is able to attempt to reacquire the profile information of the medicine product by virtue of the loop transfer of the medicine product, enabling sorting of the medicine product.

Referring to FIG. 5, the medicine transfer device 210 includes an outer conveyor belt mechanism 211 located at the outside of the high volume medicine introduction body 22, an inner conveyor belt mechanism 213 located inside the high volume medicine introduction body 22, and an oblique block 215 to return a medicine product, acquisition of the profile information of which has failed, to the medicine inlet portion 23.

The outer conveyor belt mechanism 211 includes a first conveyor belt 211*a*, which defines a bottom plane of the medicine inlet portion 23 and serves to move the medicine product disposed thereon to the rear side of the high volume medicine introduction body 22, and a second conveyor belt 211*b*, which is installed at a height lower than the first conveyor belt 211*b* and is driven in a direction orthogonal to the first conveyor belt 211*a* so as to put the medicine product transferred from the first conveyor belt 211*a* into the entrance gate 24 perforated in the rear side of the high volume medicine introduction body 22.

The first and second conveyor belts 211*a* and 22*b* have a known configuration to be operated by a motor, and are operated intermittently based on the number of medicine products stacked thereon under the control of the control unit 60, in order to prevent a great quantity of medicine products from being put into the entrance gate 24 simultaneously.

The inner conveyor belt mechanism 213 includes an oblique conveyor belt 213*a* to move the medicine product, having passed through the entrance gate 24, forwardly and upwardly inside the high volume medicine introduction body 22, and a horizontal light transmission conveyor belt 214 located at a distal end of the oblique conveyor belt 213*a*.

One end of the oblique conveyor belt 213*a* is located lower than the entrance gate 24, such that a small quantity of medicine products dropped from the entrance gate 24 is dispersed by falling shock. The oblique conveyor belt 213*a* is formed at an upper surface thereof with a plurality of linear raised portions 213*b* by a distance therebetween, so as to allow the medicine products to be captured and transferred one by one or two by two by the linear raised portions 213*b*.

The light transmission conveyor belt 214 is located in a front region of the high volume medicine introduction body 22 and serves to move a medicine product dropped from the other end of the oblique conveyor belt 213*a* forward. The light transmission conveyor belt 214 is made of a material capable of transmitting light and constitutes a part of the shadow detection device 230. That is, the shadow detection device 230 detects profile information of the medicine product, disposed on the light transmission conveyor belt 214, to allow the transfer robot arm 220 to grip and transfer the medicine product.

On the other hand, to return the medicine product onto the medicine inlet portion 23 through the return gate 26 if acquisition of the profile information of the medicine product fails, the oblique block 215 is located in front of the light transmission conveyor belt 214. An oblique surface 216 of the oblique block 215 is formed to face the return gate 26 such that the medicine product is moved laterally on the oblique surface 216 via operation of the light transmission conveyor belt 214 and thus, is discharged through the return gate 26.

The light transmission conveyor belt 214 is located higher than the first conveyor belt 211*a*. The return gate 26 has an oblique bottom, such that the medicine product, moved to the return gate 26 by the oblique block 215, naturally falls onto the first conveyor belt 211*a*.

Here, when acquisition of the profile information of the medicine product has failed, the medicine product is repeatedly circulated along the medicine transfer device 210, i.e. in the sequence of the first conveyor belt 211*a*, the second conveyor belt 211*b*, the oblique conveyor belt 213*a*, and the light transmission conveyor belt 214, and the first conveyor belt 211*a*.

Now, the transfer robot arm 220 to grip and transfer the medicine product will be described with reference to FIG. 6.

The transfer robot arm 220 includes a guide rail 211 arranged in a front and rear direction inside both sides of the high volume medicine introduction body 22, a horizontal member 222 slidably coupled to the guide rail 221, a vertical post 223 coupled to the horizontal member 222 so as to be slidable along a longitudinal direction of the horizontal member 222 and to be movable in a vertical direction, and a holding plate 224 rotatably coupled to a lower end of the vertical post 223 to grip the medicine product.

Specifically, the horizontal member 222 is movable on an X-axis along the guide rail 221. The vertical post 223 is movable on a Y-axis along the horizontal member 222 and also, is movable on a Z-axis (vertical direction). The holding plate 224 is rotatable about the Z-axis.

The holding plate 224 uses an air nozzle as grip means to lift the medicine product. The air nozzle may be replaced by other known grip means, such as a gripper having a mechanical mechanism, etc. Alternatively, in order to expose a barcode or sticker printed or attached on a surface of the medicine product to the maximum extent, a suction plate to grip one surface of the medicine product is preferably used.

Algorithms of the transfer robot arm 220 having the above described configuration and of the control unit 60 to control the transfer robot arm 220 follow a configuration of a known four-axis robot and a control method thereof.

Now, other configurations of the shadow detection device 230 and the barcode reading device 240 will be described with reference to FIGS. 6 and 7.

The shadow detection device 230 includes the light transmission conveyor belt 214 defining an upper portion thereof, the light transmission conveyor belt 214 being made of a material capable of transmitting light similar to the medicine seating conveyor 201 of the medicine introduction/discharge unit 20, a light source (not illustrated) installed to the ceiling of the high volume medicine introduction body 22, and a shadow detector 231 installed below the light transmission conveyor belt 214 to detect the profile of a medicine product revealed by the light emitted from the light source.

The shadow detector 231 is located below the light transmission conveyor belt 214 and is fitted to a lower end of a hopper 233 that serves to collect light. Thus, the shadow detector 231 produces profile information upon receiving the light having passed through the hopper 233, and transmits the profile information to the control unit 60.

The profile information acquired by the shadow detection device 230 includes position information of the medicine product, which is acquired in such a manner that the control unit 60 sets the light transmission conveyor belt 214 as a coordinate plane and calculates coordinate values of the profile of the medicine product, and size information calculated from the profile of the medicine product.

The profile information is transmitted to the control unit 60, and the control unit 60 controls operation of the transfer robot arm 220 such that the transfer robot arm 220 grips and transfers the center of an upper surface of the medicine product using the suction plate based on the profile information.

The barcode reading device 240 acquires information of the medicine product by detecting a barcode of the medicine product that has been gripped and transferred by the robot arm 220.

The barcode reading device 240 includes at least one barcode reader having a known configuration. Preferably, the barcode reading device 240 includes three barcode readers 241, 242 and 243 to simultaneously scan a bottom surface, a side surface, and an upper surface of the medicine product floated in space by the transfer robot arm 220.

Specifically, the barcode readers include a first barcode reader 241 to scan the bottom surface of the medicine product lifted by the robot arm 220, and second and third barcode readers 242 and 243 to enable the individual or simultaneous scanning of the side surface and upper surface of the medicine product.

The second barcode reader 242 and the third barcode reader 243 are arranged obliquely and parallel to each other, having an oblique barcode detection orientation.

The first to third barcode readers 241, 242 and 243 provide a scannable angular range, i.e. a three dimensional scan space 244 in which each of the first to third barcode readers 241, 242 and 243 is able to rapidly read a barcode attached to each surface of the medicine product. The transfer robot arm 220 is operated to position the gripped medicine product within the scan space 244.

Thereby, barcodes provided at the three surfaces, i.e. the bottom surface, the side surface, and the upper surface of the medicine product are able to be scanned simultaneously. If no barcode is detected from the three surfaces of the medicine product, the holding plate 224 is rotated to allow a barcode present on the remaining surface of the medicine product to be scanned.

In the meantime, in the case of the barcode present on the upper surface of the medicine product, the barcode is hidden by the holding plate 224 and thus, the barcode reader 241 has difficulty in detection of the barcode despite rotation of a tool. In this case, the medicine product is first disposed on a light transmission table provided on the barcode reader 241 and then, the transfer robot arm 220 is moved to allow the second barcode reader 242 to scan the barcode present on the upper surface of the second barcode reader 242.

The acquired information of the medicine product is stored in the control unit 60 and is transmitted to the robot arm 310 of the main body 10. To this end, the medicine product is moved to the outlet port 250 so as to be transferred to the above described robot arm 310 of the main body 10 via operation of the robot arm 220.

In this case, a discharge conveyor belt 251 is provided below the outlet port 250 to transfer the medicine product out of the high volume medicine introduction body 22, such that the robot arm 310 of the main body 10 transfers the medicine product unloaded from the robot arm 220.

In the meantime, in consideration of the case where the barcode reading device 240 fails to acquire information of the medicine product, there may be further provided the exit hole 25 to discharge the medicine product out of the high volume medicine introduction body 22.

Specifically, in the case where acquisition of the information of the medicine product has failed, e.g., because the barcode of the medicine product is damaged, the medicine product is discharged to the outside and information of a next medicine product is acquired.

To this end, a return passage 25*a* connected to the exit hole 25 is defined between the first barcode reader 241 and the outlet port 250. The robot arm 220 drops the medicine product having the non-detected barcode from above the return passage 25*a*, thereby allowing the medicine product to be discharged to the exit hole 25.

This has the effects of preventing unwanted stoppage of the system due to the medicine product having the non-detected barcode and of enabling continuous sorting of following medicine products.

Figure 8:
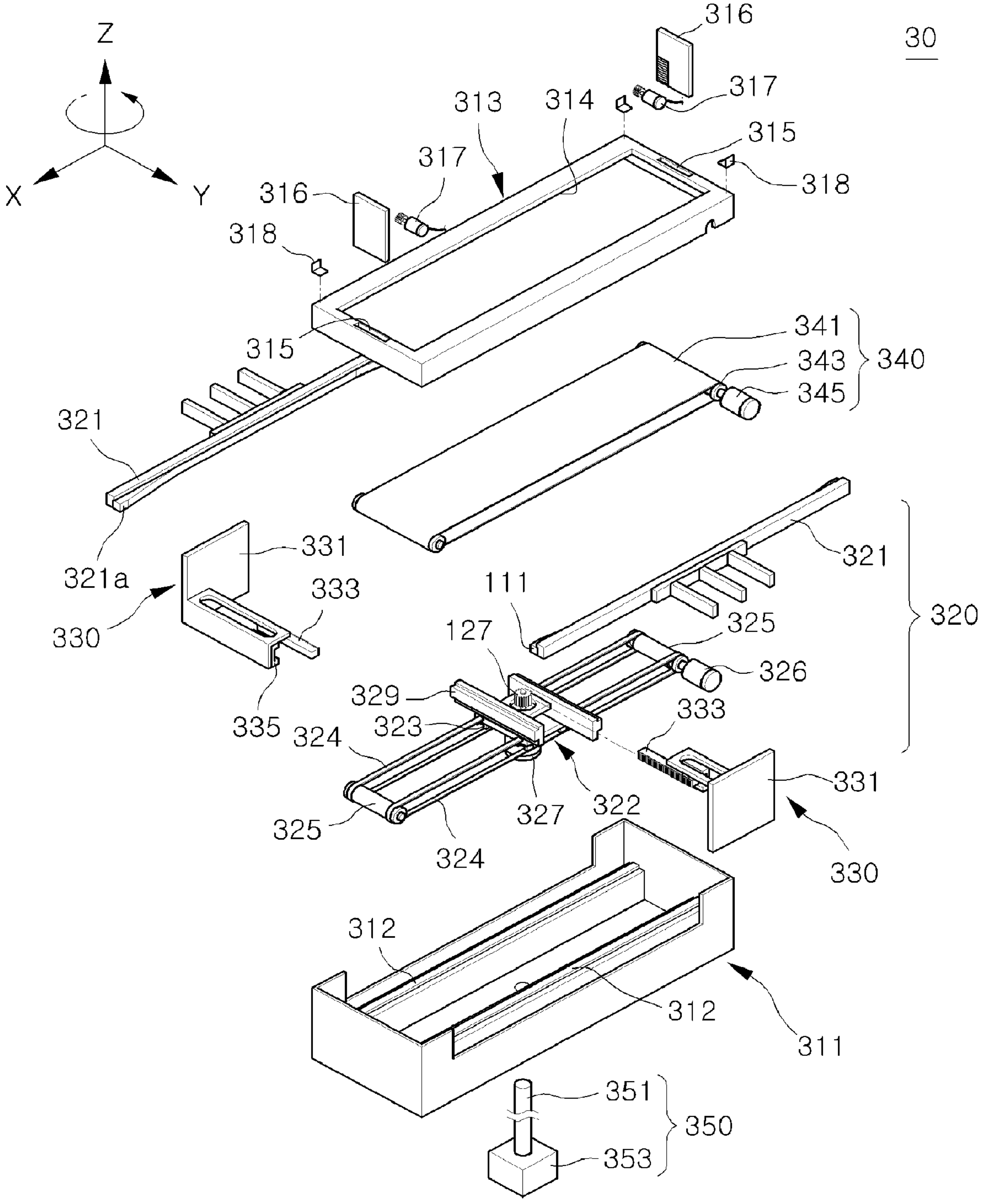
FIG. 8 is an exploded perspective view illustrating a robot arm of the automated medicine storage and medicine introduction/discharge management system according to an embodiment of the present invention.

FIG. 8 is an exploded perspective view illustrating the robot arm of the automated medicine storage and medicine introduction/discharge management system according to an embodiment of the present invention.

Figure 9:
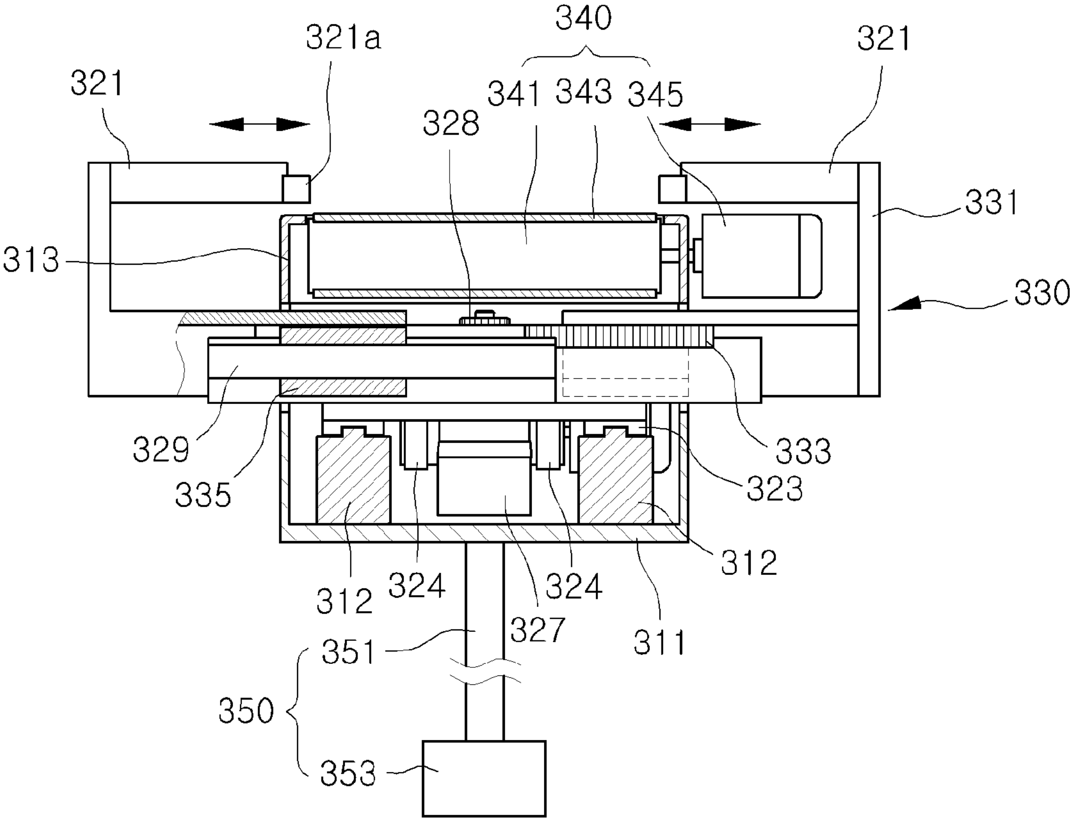
FIG. 9 is a schematic front view of the robot arm illustrated in FIG. 8.
Figure 10:
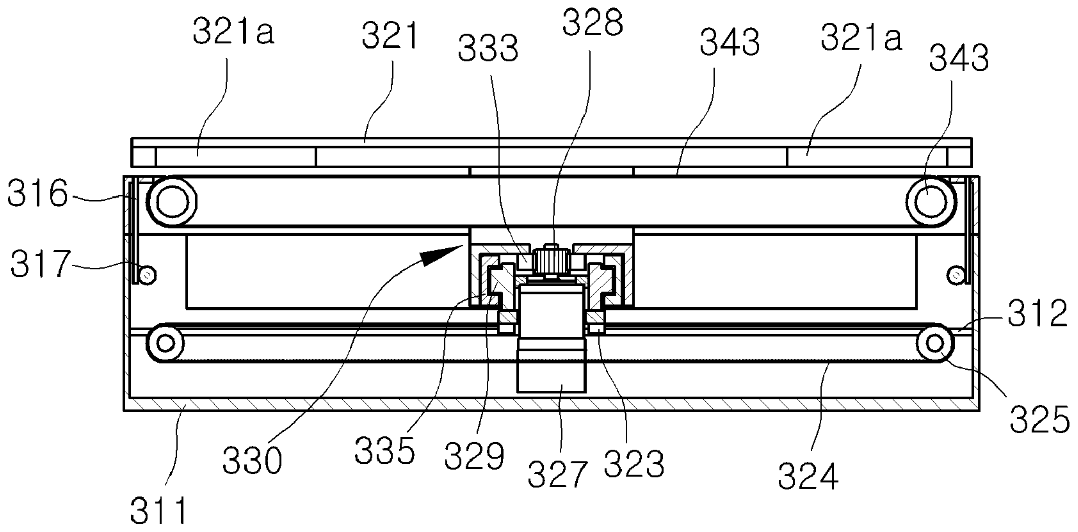
FIGS. 10 and 11 are respectively a schematic side sectional view and a schematic plan sectional view of the robot arm illustrated in FIG. 8.
Figure 11:
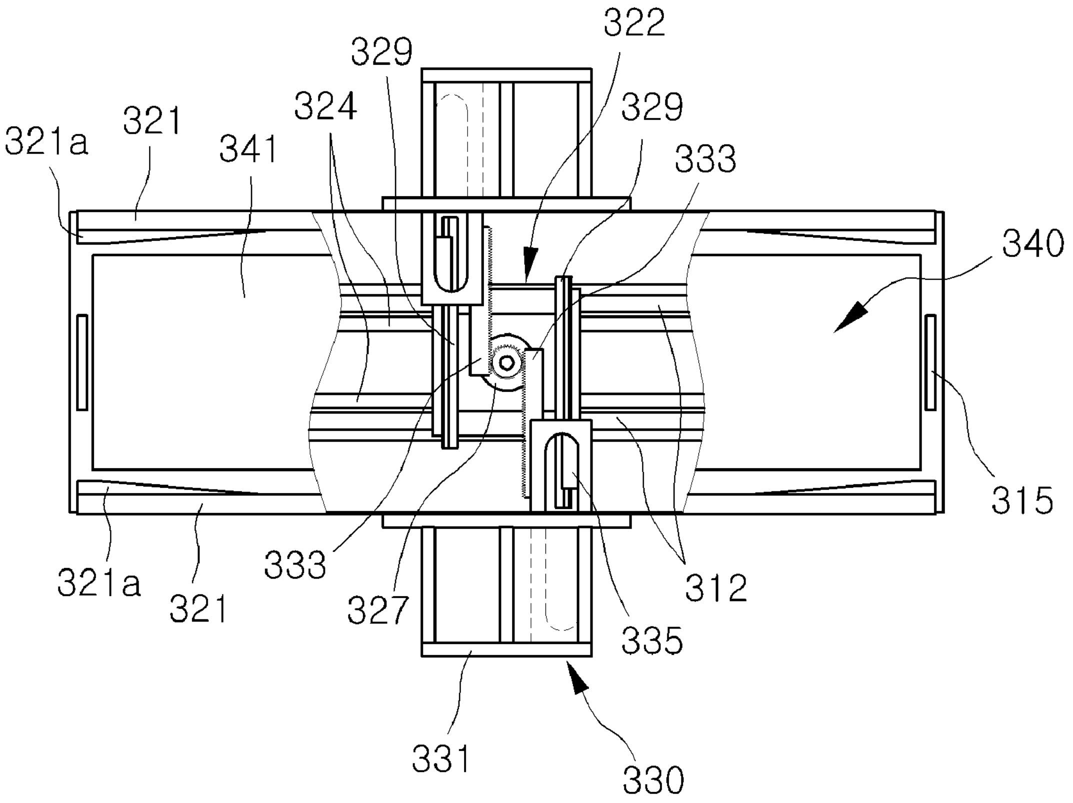

FIGS. 9 to 11 are respectively a schematic front view, a schematic side sectional view and a schematic plan sectional view of the robot arm illustrated in FIG. 8, and FIGS. 12A to 12E are views schematically illustrating operation of the robot arm used in the present invention.

As illustrated, the robot transfer unit 30 includes a vertical post 303 coupled to main guide rails 301 provided at top and bottom surfaces of the main body 10 to perform a horizontal sliding motion, and the robot arm 310 coupled to the vertical post 303 to perform a vertical sliding motion and rotation. The robot arm 310 is moved vertically or horizontally by use of the main guide rails 301 and the vertical post 303, and serves to transfer the medicine product M directed from the medicine introduction/discharge unit 20 to the front shelf 110 or the rear shelf 120 so as to store the medicine product M on the shelf, or to pull the medicine product M from the front shelf 110 or the rear shelf 120.

The robot arm 310 includes a grip device 320, a bottom transfer device 340, and a rotating device 350. The grip device 320 includes a pair of parallel grippers 321 to be moved together in a front and rear (X-axis) direction, a distance (Y-axis width) between facing inner surfaces of which is adjustable to grip the medicine product. The bottom transfer device 340 includes a conveyor belt 341 to transfer the medicine product released from the grippers 321 and other medicine products in the front and rear (X-axis) direction. The rotating device 350 serves to rotate a housing 311, on which the grip device 320 and the bottom transfer device 340 are seated, about a Z-axis.

The grip device 320 serves to grip the medicine product located on, e.g., the shelf or the medicine inlet port and thereafter, put the medicine product on the conveyor belt 341, or to grip the medicine product located on the conveyor belt 341 and thereafter, put the medicine product on the shelf or a medicine outlet port.

The bottom transfer device 340 serves to transfer the medicine product, which has been put on the conveyor belt 341 by the grip device 320, forward or rearward, thereby allowing the grip device 320 to move another medicine product to a position above the robot arm 310.

The rotating device 350 serves to rotate the grip device 320 and the bottom transfer device 340 about a rotating shaft 351 thereof, such that the medicine product gripped by the grip device 320 is moved and released by rotation of the robot arm 310 without the use of the bottom transfer device 340.

In this case, a plurality of medicine products can be sequentially loaded in a front and rear longitudinal direction of the conveyor belt 341 and this provides an advantage of transferring the plurality of medicine products simultaneously.

More specifically, when it is desired to discharge a plurality of medicine products dispersed and stored on different shelves, the robot arm 310 is able to sequentially load the plurality of medicine products on the conveyor belt 341 so as to transfer the medicine products. Therefore, the robot arm 310 is able to move between the respective shelves on which the medicine products are stored using the minimum travel distance when it is desired to collect and transfer the medicine products to the medicine introduction/discharge unit and discharge the medicine products simultaneously. Accordingly, the robot arm 310 exhibits a shortened movement path during implementation of storage or discharge of the plurality of medicine products, and this has the effect of delaying aging of equipment by virtue of a reduced operation of the robot arm 310.

In addition, as compared to a conventional robot that repeatedly moves between the medicine introduction/discharge unit 20 and the shelves to discharge medicine products one by one, the present invention can realize a significantly increased number of medicine products that can be processed every hour. That is, since a great number of medicine products can be stored or discharged simultaneously, a reduced transfer time of the great quantity of medicine products can be realized. This consequently enables an increase in the scale of the automated medicine management system.

The grip device 320 further includes a carrier 322 to move the grippers 321 in a front and rear (X-axis) direction or in a left and right (Y-axis) direction so as to adjust the distance between the grippers 321, and a pair of brackets 330.

Referring to FIG. 8, the housing 311 defining the exterior appearance of the robot arm 310 has a length smaller than a width between the front shelf 110 and the rear shelf 120 and is able to be rotated by the rotating device 350. The housing 311 includes bottom rails 312 extending in a front and rear direction at both sides of a bottom surface thereof.

The carrier 322 is provided at both sides of a bottom surface thereof with lower guiders 323 corresponding to the bottom rails 312, to allow the carrier 322 to be coupled to the bottom rails 312 and be moved in a front and rear direction. A belt 324 is coupled to front and rear ends of the carrier 322 and is circulated by a drive motor 326 in such a way that pulleys 325 provided at front and rear ends of the housing 311 are rotated by the drive motor 326.

The carrier 322, connected to the belt 324 that is driven by the drive motor 326, is movable in a front and rear direction. Here, the grippers 321 coupled to the carrier 322, as described above, are moved along with the carrier 322 via the brackets 330 as the carrier 322 moves in the front and rear direction.

A pinion 328 is provided at an upper surface of the carrier 322 and is rotated by an operation motor 327 that is provided below the carrier 322. In addition, lateral rails 329 may be further provided at front and rear ends of the carrier 322 such that lateral guides that will be described hereinafter can be slidably fitted into the lateral rails 329.

As illustrated in FIGS. 10 and 11, the pair of brackets 330 is provided at left and right sides of the housing 311. The brackets 330 are moved in a left and right (Y-axis) direction toward or away from each other via rotation of the pinion 328, and the grippers 321 are coupled respectively to upper surfaces of the brackets 330.

Now, one of the brackets 330 coupled to the left side of the housing 311 when viewed from the front side (hereinafter, referred to as a left bracket) will be described in detail. The left bracket 330 includes a vertical plate 331 arranged parallel to a side surface of the housing 311, and a rack 333 protruding from the vertical plate 331 into the housing 311 so as to be installed to a position in the front of the pinion 328. In addition, to realize more smooth leftward or rightward movement, a lateral guider 335 is coupled to the vertical plate 331 at a position parallel to the rack 333 and is slidably coupled to the lateral rail 329 provided at the front end of the carrier 322. In addition, the left gripper 321 is coupled to an upper end of the vertical plate 331.

Likewise, the right bracket 330 opposite to the left bracket 330 includes the vertical plate 331, the rack 333, and the lateral guider 335. The rack 333 is installed to a position in the rear of the pinion 328. The lateral guider 335 is slidably coupled to the lateral rail 329 provided at the rear end of the carrier 322 and a right one of the grippers 321 is coupled to an upper end of the vertical plate 331.

With the above described configuration, the brackets 330 are able to slide toward or away from each other in a left and right (Y-axis) direction via rotation of the pinion 328, causing the grippers 321 to be moved toward or away from each other so as to grip the medicine product.

The grippers 321 are arranged parallel to each other and have a length equal to a longitudinal length of the housing 311. Oblique pads 321*a* may protrude from opposite ends of facing inner surfaces of the grippers 321. The pads 321*a* may be made of an elastic material, such as rubber, silicon, etc., to prevent unwanted slippage of the gripped medicine product.

With provision of the pads 321*a* protruding from the inner surfaces of the grippers 321 as described above, it is possible to selectively grip only a foremost or rearmost one of a plurality of medicine products having the same size located on the conveyor belt 341.

The bottom transfer device 340 is fitted into a lid 313 having a longitudinal groove 314 recessed in a top surface thereof. The bottom transfer device 340 includes pulleys 343 provided at front and rear positions inside the lid 313, a belt motor 345 to rotate the pulleys 343, and the conveyor belt 341 wound on the pulleys 343 to be moved in a front and rear direction. In this case, the conveyor belt 341 is mounted at the same height as the groove 314 of the lid 313, defining a plane on which the medicine product is disposed.

Stopper plates 316 may be provided at front and rear ends of an upper surface of the robot arm 310 and be moved vertically to prevent unwanted separation of the medicine product.

The stopper plates 316 are fitted into slits 315 formed in front and rear ends of the lid 313, and are moved upward out of the slits 315 or moved downward into the slits 315 via rotation of a motor 317 provided in the lid 313.

The stopper plates 316 are moved upward during movement of the robot arm 310, serving to prevent the medicine product disposed on the conveyor belt 341 from falling. When the medicine product is moved rearward due to operation of the bottom transfer device 340, the stopper plate 316 provided at the rear end is moved upward, preventing the medicine product from falling rearward.

The stopper plates 316 prevent unwanted separation of the medicine product during movement of the robot arm 310 or operation of the bottom transfer device 340, enabling safe transfer of the medicine product.

A pair of position sensors 318 may be further provided at the front and rear ends of the upper surface of the robot arm 310, to detect a position of the medicine product.

The pair of position sensors 318 provided at the front and rear ends of the upper surface of the robot arm 310 are known infrared sensors configured to sense the medicine product passing through the front or rear end of the robot arm 100 and function as reference points to calculate a required movement distance of the medicine product upon introduction or discharge of the medicine product.

More specifically, to stably dispose a medicine product on a selected shelf based on the previously input size of the medicine product and the length of the shelf, a control device (not illustrated) calculates a movement distance of the medicine product to be moved forward or rearward based on signals from the position sensors 318 located at specific locations. After the grippers 321 grip the medicine product and are moved in a front and rear direction by the calculated movement distance, the medicine product is released from the grippers 321 thus being disposed on the shelf.

The position sensors 318 function as reference points to measure the above described movement distance of the medicine product. That is, as the grippers 321 are moved in a front and rear direction by the movement distance of the medicine product immediately after one of the position sensors 318 senses that the medicine product gripped by the grippers 321 passes the distal end of the robot arm 310, the medicine product can be stably disposed on the shelf.

Hereinafter, operation of the robot transfer unit 30 of the automated medicine management system according to the present invention will be described with reference to FIGS. 12A to 12E.

A process of discharging a plurality of medicine products located on the shelves will be described.

First, the robot arm 310 is moved along the vertical post 303 and the main guide rails 301 to a target shelf on which the medicine product M is located. The robot arm 310 is located lower than the target shelf to prevent the medicine product M from being caught by a front end of the robot arm 310 during horizontal movement thereof.

Figure 12A:
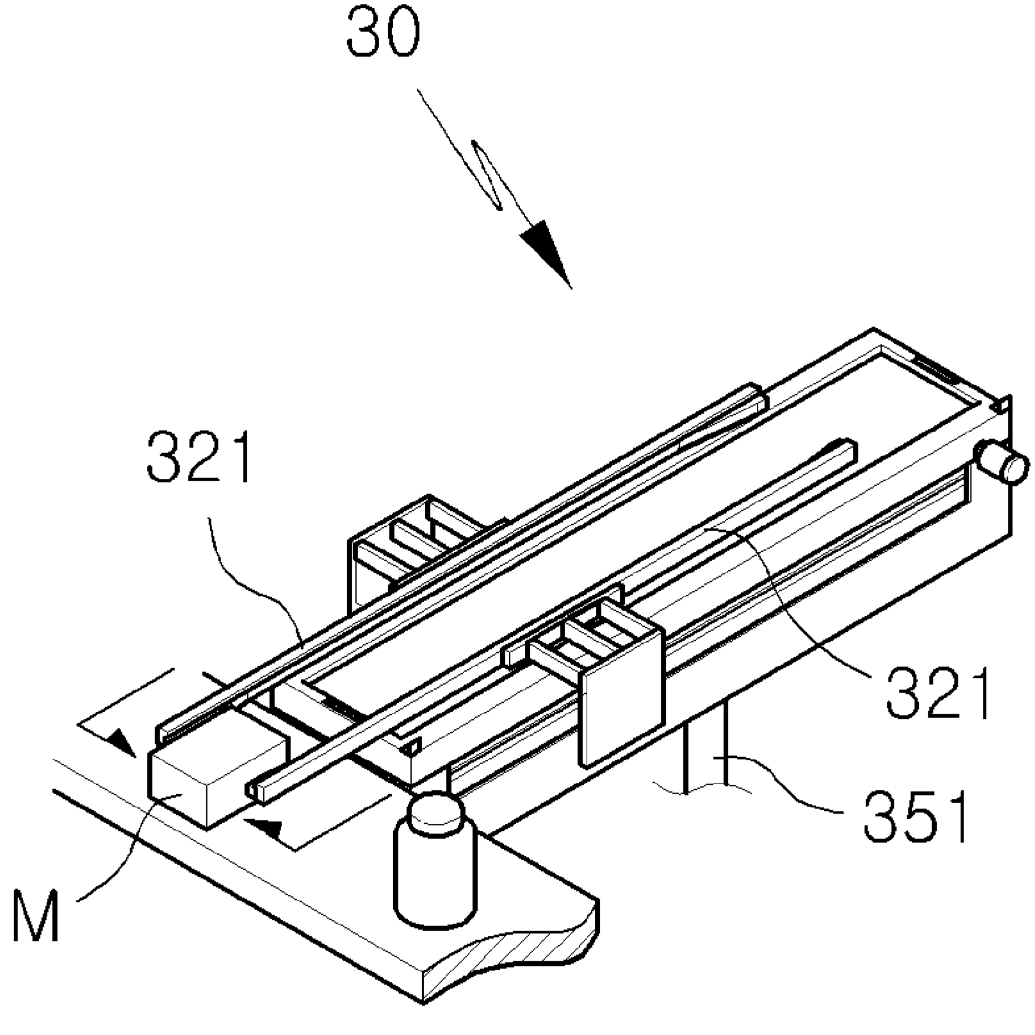
FIG. 12A is a view illustrating the robot arm illustrated in FIG. 8, which enter a shelf.

The operation motor 327 is driven to move the grippers 321 away from each other in the left and right (Y-axis) direction to have an interval larger than the width of the medicine product M based on previously input size information of the medicine product M. Thereafter, the drive motor 326 is operated, causing the grippers 321 to be moved in a front and rear (X-axis) direction such that the pads 321*a* are located at opposite sides of the medicine product M as illustrated in FIG. 12A.

Figure 12B:
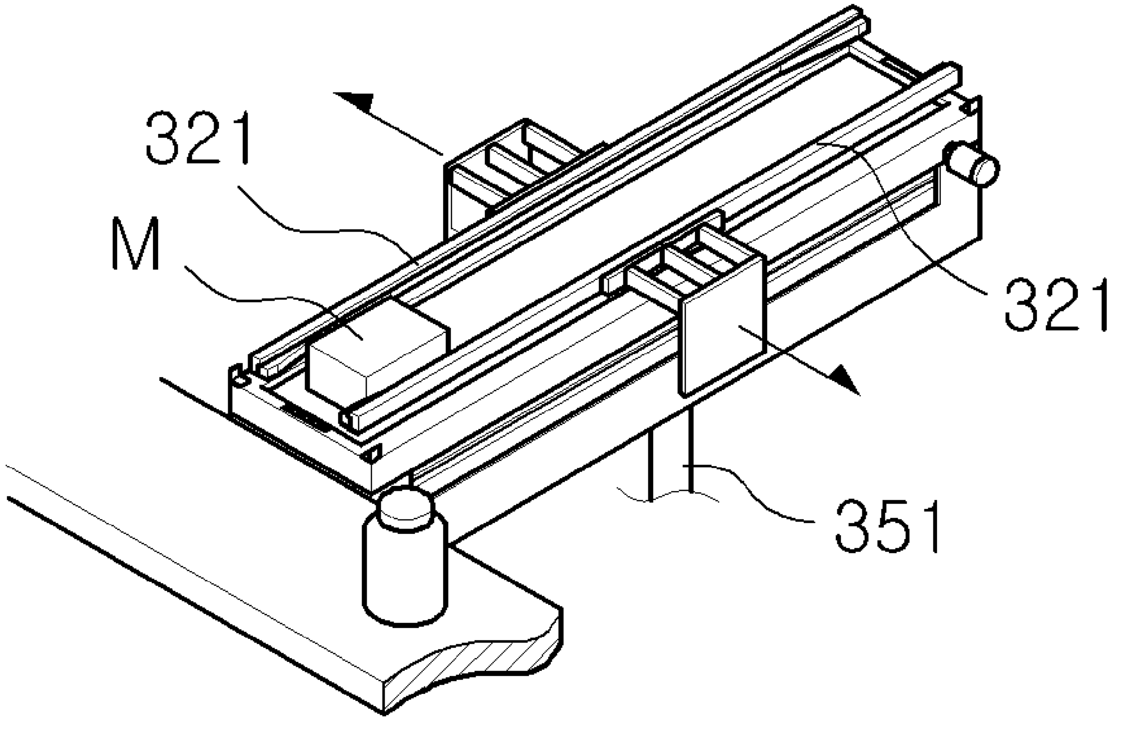
FIG. 12B is a view illustrating a medicine product gripped by and seated on the robot arm illustrated in FIG. 8.

Next, as illustrated in FIG. 12B, the operation motor 327 is rotated in an opposite direction, causing the grippers 321 to grip the medicine product M and thereafter, the drive motor 326 is rotated in an opposite direction, causing the medicine product M to be seated on the conveyor belt 341. Then, the grippes 321 are moved away from each other to release the medicine product M.

Figure 12C:
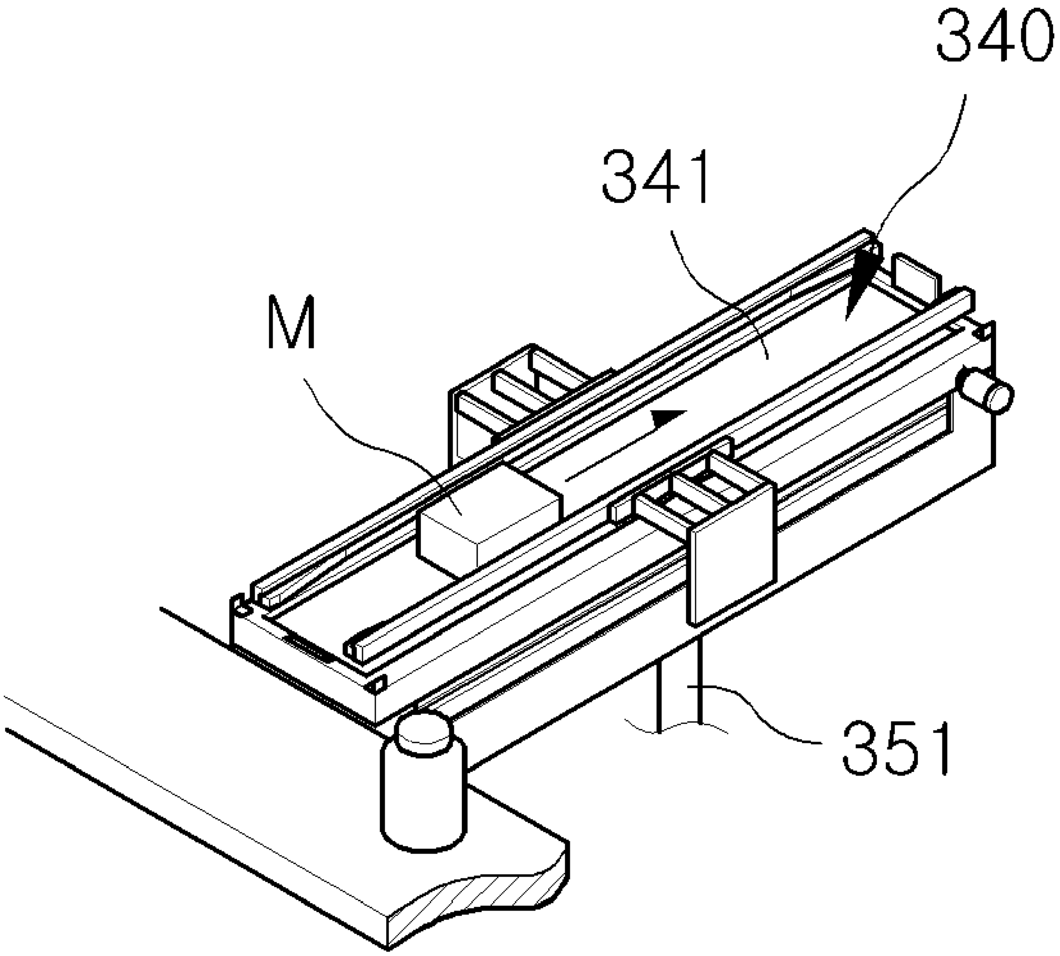
FIG. 12C is a view illustrating transfer of the seated medicine product from one side to the other side on the robot arm illustrated in FIG. 8.

Next, as illustrated in FIG. 12C, the belt motor 345 is driven to operate the conveyor belt 341 such that the medicine product M is moved to the center of the bottom transfer device 340 in order to prepare a place where a following medicine product will be placed.

Figure 12D:
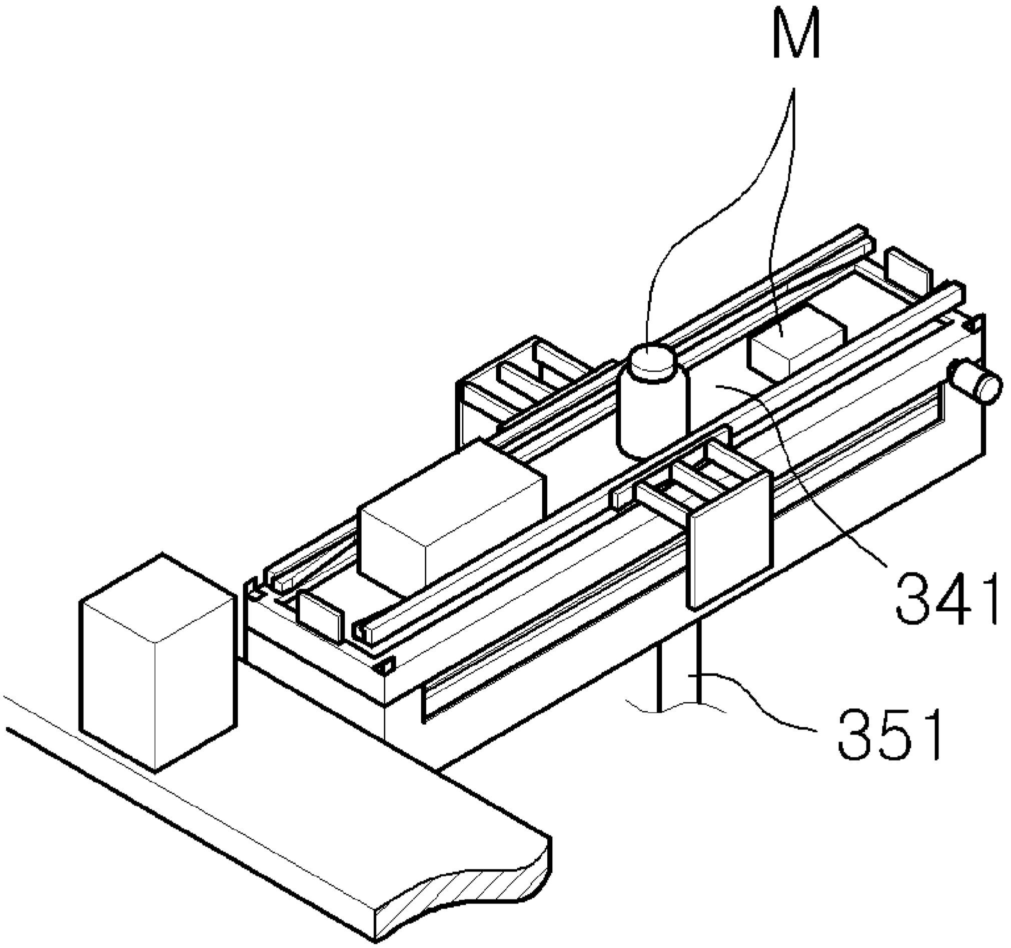
FIG. 12D is a view illustrating a process of seating and transferring a plurality of medicine products on the robot arm illustrated in FIG. 8.

Next, the robot arm 310 is moved to another shelf, and the above described operation is repeated until a plurality of medicine products M is loaded on the conveyor belt 341 as illustrated in FIG. 12D.

Figure 12E:
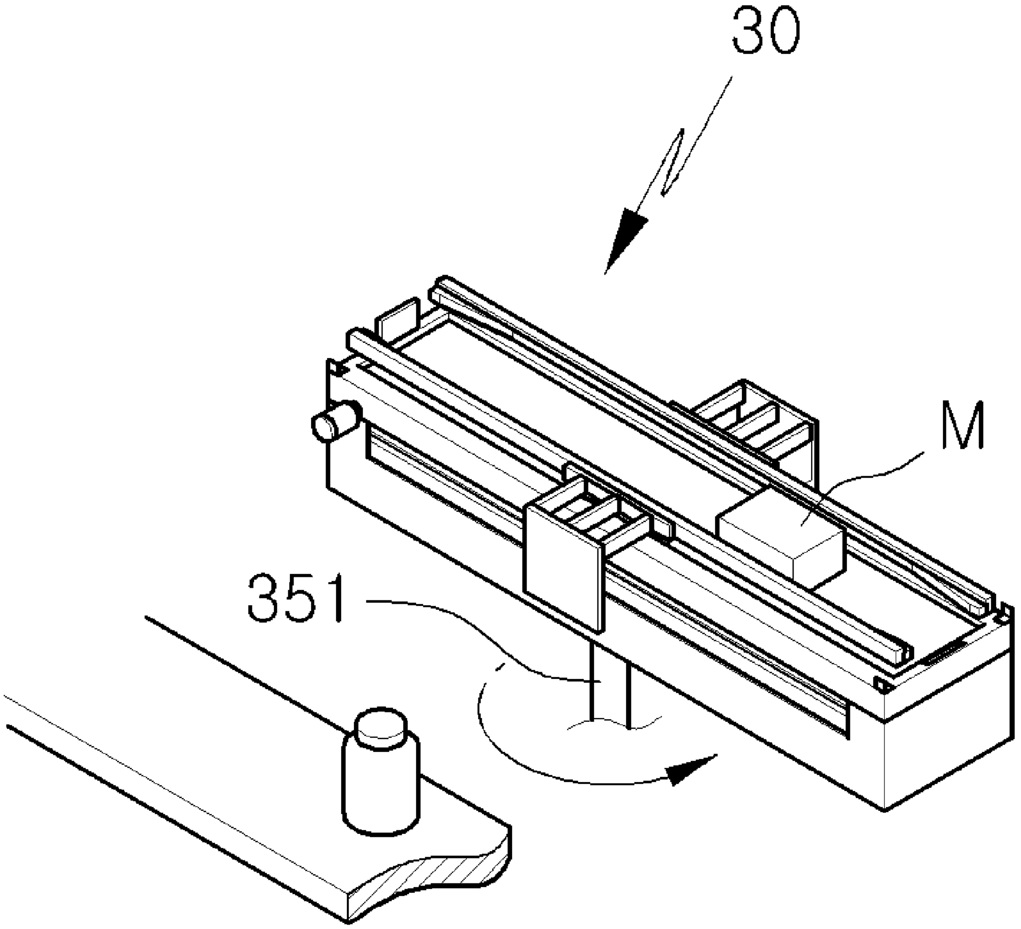
FIG. 12E is a view illustrating rotation of the robot arm illustrated in FIG. 8 on which a medicine product is seated.

Here, the robot arm 310, as illustrated in FIG. 12E, is able to be rotated in the course of being moved to another shelf.

On the other hand, to discharge the medicine products M loaded on the robot arm 310, the robot arm 310 is moved higher than the medicine seating conveyor 201, and the grippers 321 perform a left and right (Y-axis) direction movement as well as a front and rear (X-axis) direction movement, to sequentially discharge the medicine products M onto the medicine seating conveyor 201.

In this case, the movement distance of the grippers 321 by the drive motor 326, the operation motor 327, and the belt motor 345 and the movement distance of the conveyor belt 341 are calculated by the control device based on previously input size information of the medicine product M and size information of the automated medicine management system. In this case, to prevent unwanted slippage of the medicine product M on the conveyor belt 341, the control device controls a front and rear (X-axis) direction movement distance of the grippers 321 used to grip and discharge the medicine product M, starting from a medicine discharge beginning time detected by the position sensors 318.

In the meantime, when it is desired to transfer a plurality of medicine products having different sizes, the medicine products M are loaded on and transferred by the robot arm 310 in order of increasing size, to allow the grippers 321 having parallel linear inner surfaces to sequentially grip the medicine products M.

In addition, when it is desired to discharge a plurality of medicine products M dispersed and stored at the front and rear shelves 110 and 120, a rotation direction of the conveyor belt 341 provided in the bottom transfer unit 340 as well as the above described operation of the grippers 321 may be adjusted to place the plurality of medicine products M on the bottom transfer unit 340 so as to transfer the medicine products M simultaneously.

Figure 13:
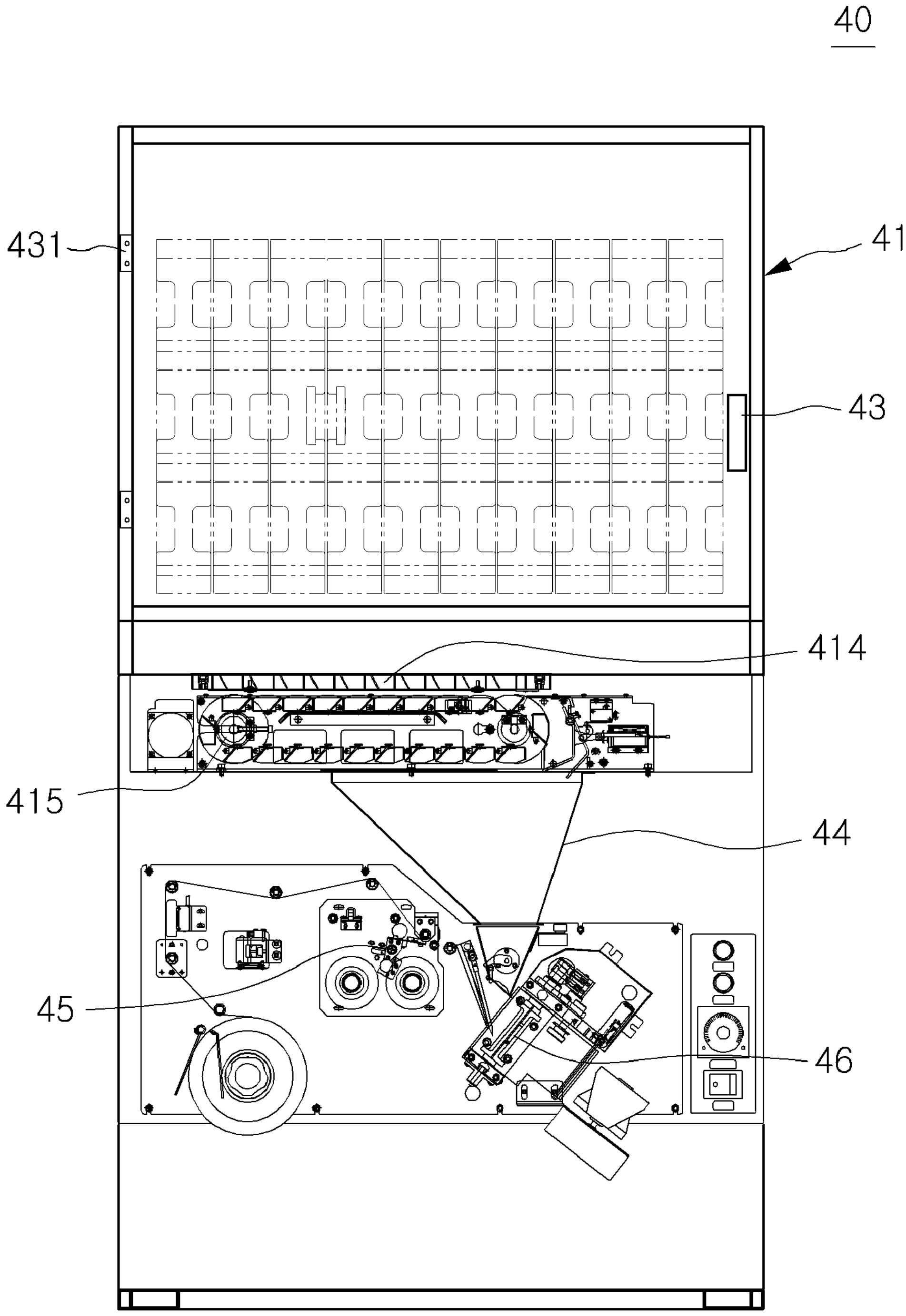
FIG. 13 is a view illustrating a tablet packing unit of the automated medicine storage and medicine introduction/discharge management system according to the present invention.
Figure 14:
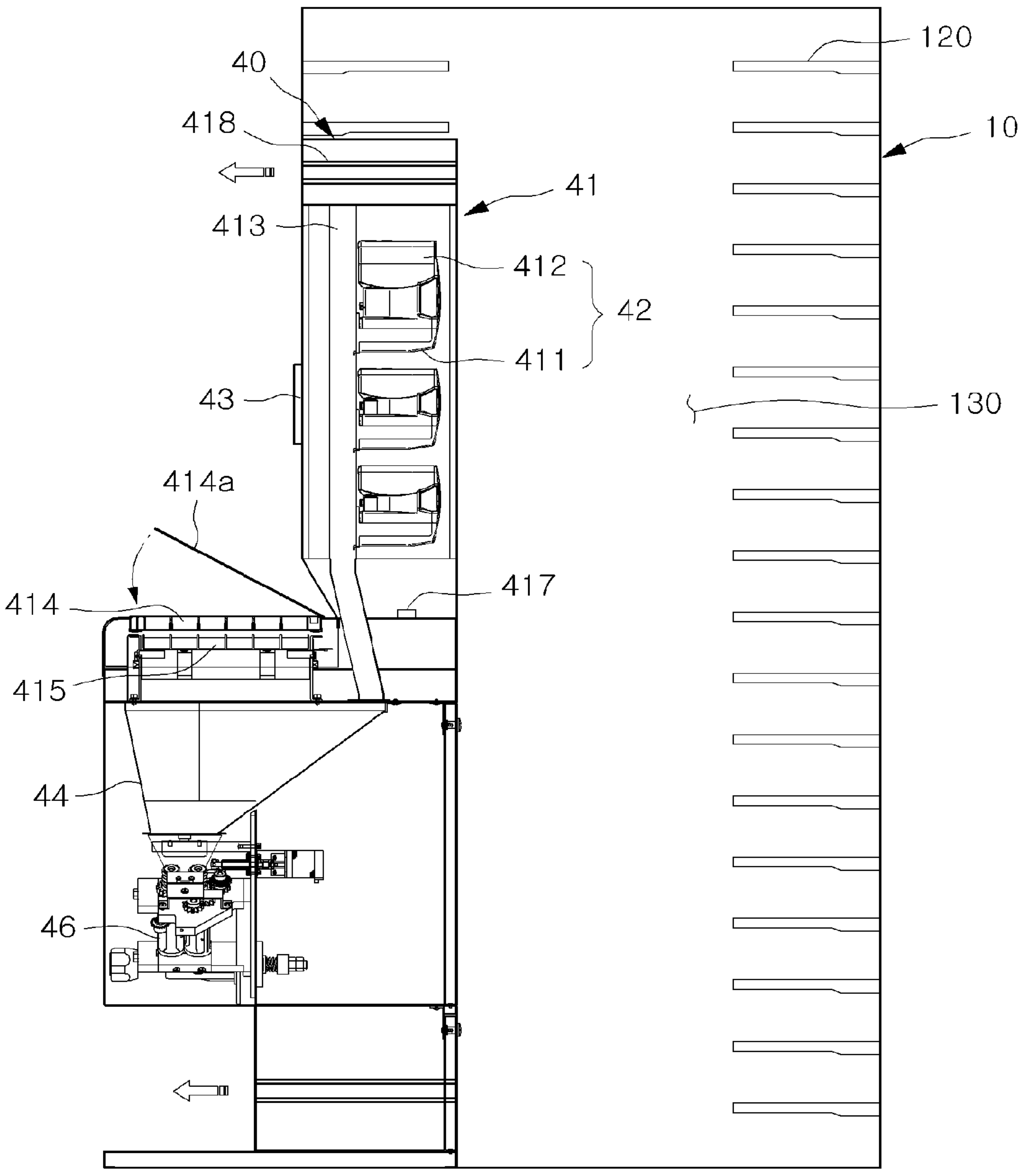
FIG. 14 is a schematic side sectional view of the tablet packing unit illustrated in FIG. 13.

FIG. 13 is a view illustrating the tablet packing unit of the automated medicine storage and medicine introduction/discharge management system according to the present invention, and FIG. 14 is a schematic side sectional view of the tablet packing unit illustrated in FIG. 13.

Referring to the drawings, the tablet packing unit 40 includes a tablet discharge device 41 to discharge only tablets required for a combination of tablets, a distribution tray 414 located below the tablet discharge device 41 to discharge ½ or ¼ sized tablets, a printing device 45 to print the kind of a medicine on a packing pouch, and a sealing device 46 to seal the packing pouch.

Here, once tablets are distributed from at least one tablet cassette 412 mounted on a tablet cassette shelf 42 and/or the distribution tray 414 through a corresponding discharge passage 413, the tablet discharge device 41 transfers the distributed tablets into a hopper 44. A predetermined quantity of tablets collected in the hopper 44 is packed into a packing pouch on which medicine information is printed by the printing device 45 and then, the packing pouch containing the tablets is sealed by the sealing device 46 prior to being discharged from the main body 10.

The tablet discharge device 41 includes the tablet cassette shelf 42 installed in the main body 10, and the tablet cassette shelf 42 is located close to the front shelf 110 of the main body 10.

Preferably, a door 43 is provided to open the main body 10. The door 43 has a hinge member 431 provided at one side of the tablet cassette shelf 42 coming into contact with an outer surface of the main body 10, causing the tablet cassette shelf 42 to be pivoted from a front surface of the main body 10 to open the main body 10.

Accordingly, the user is able to open the door 43 when it is desired to manually clean the tablet cassette shelf 42 and the discharge passage 413.

In another embodiment, as illustrated in FIG. 14, the tablet packing unit 40 preferably includes guide rails 418 provided respectively at both side surfaces and upper and lower surfaces thereof, so as to be separated from and pulled forward out of the main body 10.

In the present embodiment, a rotating shaft 417 is provided at the bottom of the tablet discharge device 41 and is driven by a not shown drive unit to rotate the tablet discharge device 41 in consideration of user convenience. This allows the user to clean the tablet cassette 412 or the discharge passage 413 in which tablet powder is present and also, to remove impurities present in the distribution tray 414, the printing device 45, and the sealing device 46.

The tablet cassette shelf 42 includes a cassette pedestal 411 on which the tablet cassette 412 is disposed. The cassette pedestal 411 supports the tablet cassettes 412 disposed on an upper surface of the cassette pedestal 411, and functions to rotate a rotator (not shown) provided in the tablet cassette 412 by use of a motor provided therein, so as to discharge tablets received in the tablet cassette 412 one by one.

The tablet cassette 412 is able to be separably installed on the cassette pedestal 411 by the robot arm 310 of the robot transfer unit 30.

The tablet cassette 412 is installed to communicate with the discharge passage 413. The discharge passage 413 is located close to the front surface of the main body 10 to communicate with the tablet cassette 412.

Preferably, the distribution tray 414 is installed to protrude forward of the main body 10 and further includes a tray cover 414*a* to manually open or close an upper surface of the distribution tray 414. The distribution tray 414 is configured to receive and store a combination of tablets, made by a pharmacist, through the upper surface thereof, and the tray cover 414*a* serves to prevent impurities from entering the distribution tray 414.

Accordingly, once the user inputs tablet data using the control unit 60, tablets in the tablet cassette 412 are discharged through the discharge passage 413 and are transferred through the hopper 44 to thereby be sealed in respective packing pouches by the sealing device 64.

Here, the printing device 45 may directly print medicine information, i.e. patient name, kind of the medicine, dosage details, etc., on the packing pouch. Also, the label attachment unit 50 may attach a label to the packing pouch via operation of the robot arm 310.

The packing pouch containing tablets may be directly discharged from the sealing device 46 to the outside of the main body 10, or may be discharged out of the main body 10 by way of the medicine introduction/discharge unit 20 via operation of the robot arm 310.

Figure 15:
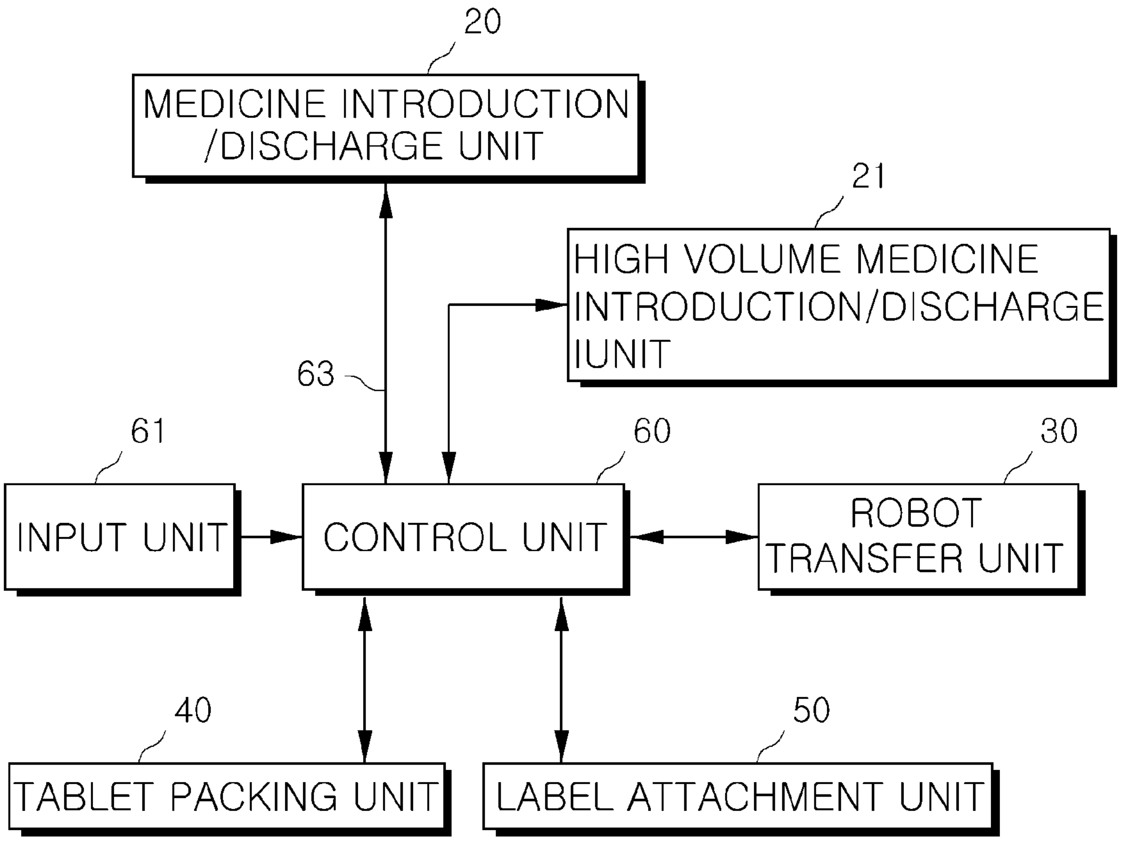
FIG. 15 is a schematic view illustrating a control unit of the automated medicine storage and medicine introduction/discharge management system.

FIG. 15 is a schematic view illustrating the control unit of the automated medicine storage and medicine introduction/discharge management system.

Referring to the drawing, the control unit 60 includes an input unit 61 to allow the user to directly input information of a stored medicine by use of, e.g., a touch display provided at an outer surface of the main body 10 and barcode readers provided at several positions for the automatic input of information.

An information processing unit (not shown) is provided to produce required information based on information recorded in the control unit 60 using the input unit 61. For example, the information processing unit may be used to produce profile information of a medicine product based on the bottom surface area and height of the medicine product detected by the shadow detection device. In addition, an information transmission unit 63 is provided to transmit a drive command to each unit for implementation of a command allotted to the corresponding unit.

Although not shown, the control unit 60 includes a security device to allow only a certified user to operate the system.

With the above described automated medicine storage and medicine introduction/discharge management system, it is possible to input information of a medicine product inside the main body 10, to receive the medicine product at an appropriate position based on the input information, to discharge a desired medicine in an automated manner, and to realize the packing and discharge of tablets required for a combination of tablets.

In addition, since the main body 10 stores data related to different medicine products, the automated medicine storage and medicine introduction/discharge management system advantageously enables integrated and automated management of, e.g., the expiration date or storage conditions of the medicine products.

As apparent from the above description, the present invention provides an automated medicine storage and medicine introduction/discharge management system having the following several effects.

First, most medicine products are stored in a single main body and are able to be introduced into or discharged out of the main body in an automatic manner. This can minimize a manual operation, resulting in labor cost saving.

Second, it is possible to measure the size of a medicine product to be introduced into the main body and thus, to transfer the medicine product to an appropriate position calculated based on the size of the medicine product. This can assure effective utilization of a medicine receiving space and consequently, accommodation of the maximum quantity of medicine products in a narrow space.

Third, upon measurement of the size of the medicine product, a bottom surface area and height of the medicine produce are sensed to calculate the size of the medicine product. This can assure selection of a medicine receiving space suitable to the corresponding medicine product for the optimal accommodation of the medicine product.

Fourth, a label, on which information of a medicine product introduced into or discharged out of the main body is recorded, is attached to the medicine product. This can assure easy management of the expiration date or usage of the medicine product.

Fifth, a robot arm is able to be horizontally and vertically moved in a narrow working space except for the medicine receiving space. The robot arm is also able to be rotated. Such free movement of the robot arm can assure easy introduction or discharge of a medicine product.

Sixth, grippers of the robot arm are designed to enter a shelf on which a medicine product is stored. This can allow a plurality of medicine products stored on the shelf to be discharged once.

Seventh, the robot arm can prevent a medicine product seated thereon from falling and being damaged.

Eighth, along with other medicine products, tablets ti be combined according to a prescription can be stored in the single main body so as to be introduced into or discharged out of the main body in an automated manner. This can assure easy storage and management of medicine.

Ninth, the tablets stored in the main body are able to be packed as a combination of tablets within the main body prior to being discharged out of the main body. This can limit a user movement path within the main body, resulting in efficient management and discharge of medicine.

Tenth, a tablet discharge device in which a tablet cassette is installed can be opened from the outside of the main body. This can assure easy cleaning of the tablet cassette and a discharge passage.

Eleventh, the tablet discharge device in which a combination of tablets is made and a tablet packing device can be pulled out of the main body. This can assure easy manual cleaning or repair/maintenance of the tablet discharge device and the tablet packing device in which much tablet powder is present.

Twelfth, the temperature and humidity of the main body are kept at the optical storage conditions of medicine products. This can prevent deterioration of medicine.

Thirteenth, information of a great quantity of medicine products to be introduced into the main body can be input in an automated manner. This can reduce labor and prevent generation of handwriting errors.

Fourteenth, with provision of an outer conveyor belt mechanism, an inner conveyor belt mechanism, and an oblique block capable of reintroduction of a medicine product through a return gate, even if no information of the medicine product is input, input of the information can be retried. This can minimize a need for a manual operation.

Fifteenth, a position of a medicine product can be detected using a light transmission conveyor belt. This can assure accurate detection of profile information of the medicine product.

Sixteenth, a plurality of barcode readers is provided to read barcodes of a medicine product in several directions. This can reduce a time required to read the barcode of the medicine product and achieve an enhanced reading accuracy.

Seventeenth, automated input and recording of all information using a control unit as well as manual information input are possible, and the control unit can be controlled only by an authorized user. This can increase security for poison or special medicine.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An automated medicine storage and medicine introduction/discharge management system comprising:

- a main body in which a plurality of receiving shelves is arranged, the main body having a door to enable user access;
- a medicine introduction/discharge unit installed in one side region of the main body to introduce or discharge a medicine product into or out of the main body;
- a robot transfer unit installed in the main body to transfer the medicine product, introduced via the medicine introduction/discharge unit, to each receiving shelf of the main body, or to discharge the medicine product received in the receiving shelf;
- a control unit to control operations of the main body, the medicine introduction/discharge unit, and the robot transfer unit;

wherein the robot transfer unit includes:

- main guide rails installed at inner ceiling and bottom surfaces of the main body respectively;
- a vertical post inserted into the main guide rails to perform a horizontal sliding motion; and
- a robot arm installed to the vertical post so as to move to each receiving shelf within the main body via vertical and horizontal movements and rotation thereof; and wherein the robot arm includes:

- a grip device having a pair of parallel grippers to be moved together in a front and rear (X-axis) direction, a distance (Y-axis width) between facing inner surfaces of which is adjustable to grip the medicine product;
- a bottom transfer device having a conveyor belt to transfer the medicine product released from the grippers and other medicine products in the front and rear (X-axis) direction; and
- a rotating device installed beneath the bottom transfer device to rotate the bottom transfer device.

2. The system according to claim 1, wherein the medicine introduction/discharge unit includes:

- a medicine seating conveyor installed to communicate the interior of the main body with the outside through an opening perforated in a position of the main body and having an upper surface on which the medicine product is seated;
- a door member installed in a vertically movable manner to open or close the opening of the main body when the medicine product is put on or taken out from the medicine seating conveyor;
- a shadow detection sensor installed under the medicine seating conveyor and having a light source to detect a shadow image of a bottom surface of the medicine product seated on the medicine seating conveyor; and
- a height meter installed to one side of the door member and serving to measure a height of the medicine product seated on the medicine seating conveyor via vertical movement of the door member.

3. The system according to claim 2, wherein the medicine seating conveyor is made of a light transmission material.

4. The system according to claim 1, further comprising:

- a label attachment unit provided at a side of the medicine introduction/discharge unit and serving to print information of the medicine product to be introduced into the main body and attach the label to the medicine product.

5. The system according to claim 4, wherein the label attachment unit is located within the main body, and includes a label printing device to print and discharge the label, and a label attachment device to press and attach the label, printed by the label printing device, onto an upper surface of the medicine product via vertical movement thereof.

6. The system according to claim 1, wherein the grip device includes:

- a carrier installed on a rail extending in a front and rear direction inside a housing and coupled to a belt, circulated in the front and rear direction by a drive motor, so as to be moved in the front and rear direction, the carrier having a pinion installed thereon, rotation of which is controlled by an operation motor; and a bracket having a rack engaged with the pinion to be moved leftward or rightward via rotation of the pinion and a vertical plate provided at a distal end of the rack and coupled with a corresponding one of the grippers.

7. The system according to claim 6, wherein the pair of grippers is installed parallel to each other, and oblique pads protrude from opposite ends of facing inner surfaces of the grippers.

8. The system according to claim 1, wherein the robot arm further includes stopper plates provided at front and rear ends of an upper surface thereof and adapted to be moved vertically to prevent separation of the medicine product.

9. The system according to claim 1, wherein the robot arm further includes position sensors provided at front and rear ends of an upper surface thereof and serving to sense the medicine product to be discharged.

10. The system according to claim 1, wherein the robot arm has a length to allow the robot arm to be rotated by the rotating device within the main body.

11. The system according to claim 1, further comprising:

a tablet discharge device including a tablet cassette shelf on which a plurality of tablet cassettes is mounted so as to be separable by the robot transfer unit, the tablet cassettes being installed to communicate with respective discharge passages to make a combination of tablets; and a tablet packing unit including a distribution tray located below the tablet discharge device to discharge ½ or ¼ sized tablets, a printing device to print information of the tablets on a packing pouch in which the tablets received in the distribution tray are packed, and a sealing device to seal the packing pouch.

12. The system according to claim 11, wherein the tablet discharge device includes a door having one side hinged to the main body to allow a front surface of the main body to be opened from the outside, so as to expose a front region of the main body in which the discharge passages are located and the tablet cassette shelf is installed.

13. The system according to claim 11, wherein the tablet discharge device and the tablet packing unit are provided at opposite side surfaces thereof with guide rails so as to be pulled out of the main body, and the tablet discharge device includes a rotating shaft connected to a drive unit so as to be rotatable in a pulled position thereof.

14. The system according to claim 1, wherein the main body is provided with a refrigerator and a humidifier to keep the main body at a constant temperature and humidity.

15. The system according to claim 1, further comprising:

a high volume medicine introduction/discharge unit provided in the main body to introduce a great quantity of medicine products and detect kinds of the medicine products.

16. The system according to claim 15, wherein the high volume medicine introduction/discharge unit includes:

a medicine transfer device to introduce the medicine products into a high volume medicine introduction body installed to communicate with the main body, the medicine products being transferred through the interior of the high volume medicine introduction body from the outside in a loop route;

a shadow detection device to detect a profile of each of the medicine products passing through the interior of the high volume medicine introduction body so as to produce profile information;

a transfer robot arm to grip and transfer each of the medicine products based on the profile information; and a barcode reading device to acquire information of the medicine products by reading a barcode of the gripped medicine product.

17. The system according to claim 16, wherein the medicine transfer device includes:

an outer conveyor belt mechanism to transfer the medicine products from a medicine inlet portion, provided at the outside of the high volume medicine introduction body, into the high volume medicine introduction body through an entrance gate perforated in one side of the high volume medicine introduction body;

an inner conveyor belt mechanism including an oblique conveyor belt to move the medicine products having passed through the entrance gate, and a light transmission conveyor belt horizontally installed at a distal end of the oblique conveyor belt; and an oblique block provided in front of the light transmission conveyor belt to allow the medicine products to return to the inlet portion through a return gate perforated in the other side of the high volume medicine introduction body.

18. The system according to claim 17, wherein the transfer robot arm displaces a position of the medicine product on the light transmission conveyor belt to repeatedly detect the profile of the medicine product if the profile information acquired by the shadow detection device is unclear.

19. The system according to claim 16, wherein the transfer robot arm includes a suction plate provided at a lower end thereof to grip an upper surface of the medicine product via air suction.

20. The system according to claim 16, wherein the barcode reading device includes:

a first barcode reader to scan a bottom surface of the medicine product when the medicine product is horizontally rotated in the air while being gripped by the transfer robot arm; and second and third barcode readers to scan the upper surface and side surface of the medicine product individually or simultaneously.

21. The system according to claim 1, wherein the control unit includes:

an input unit to input information of the medicine product to be introduced into or discharged out of the main body and to record the information on a database;

an information processing unit to acquire desired information from the information input by the input unit; and a transmission unit to transmit a drive command to each unit.

* * * * *